United States Patent
Sudo

(10) Patent No.: US 9,681,048 B2
(45) Date of Patent: Jun. 13, 2017

(54) IMAGE CAPTURING APPARATUS AND METHOD FOR CONTROLLING THE SAME

(71) Applicant: CANON KABUSHIKI KAISHA, Tokyo (JP)

(72) Inventor: Koji Sudo, Machida (JP)

(73) Assignee: Canon Kabushiki Kaisha, Tokyo (JP)

(*) Notice: Subject to any disclaimer, the term of this patent is extended or adjusted under 35 U.S.C. 154(b) by 200 days.

(21) Appl. No.: 14/579,862

(22) Filed: Dec. 22, 2014

(65) Prior Publication Data

US 2015/0189180 A1 Jul. 2, 2015

(30) Foreign Application Priority Data

Dec. 27, 2013 (JP) .................................. 2013-272045

(51) Int. Cl.
| | |
|---|---|
| H04N 5/225 | (2006.01) |
| H04N 5/222 | (2006.01) |
| H04N 5/228 | (2006.01) |
| H04N 5/232 | (2006.01) |

(52) U.S. Cl.
CPC ..... *H04N 5/23245* (2013.01); *H04N 5/23222* (2013.01); *H04N 5/23293* (2013.01)

(58) Field of Classification Search
CPC ....... H04N 2201/0084; H04N 21/4312; H04N 5/2256; H04N 5/2354; G06T 7/254; G06T 7/194; G06T 2207/20221; G06T 2207/30196
USPC ... 348/135, 143, 144, 208.12, 208.15, 211.6, 348/208.14, 218.1, 220.1, 333.01, 333.02, 348/333.04, 346, 367; 396/155, 163, 165, 396/176, 201
See application file for complete search history.

(56) References Cited

U.S. PATENT DOCUMENTS

| | | | | |
|---|---|---|---|---|
| 9,033,501 | B2* | 5/2015 | Kishida | A61B 3/12 351/206 |
| 9,594,943 | B1* | 3/2017 | Brain | G06K 9/00221 |
| 2006/0204236 | A1* | 9/2006 | Sasaki | G02B 21/008 396/265 |
| 2008/0079817 | A1* | 4/2008 | Murata | H04N 1/0044 348/222.1 |
| 2008/0273097 | A1* | 11/2008 | Nagashima | G06K 9/3241 348/231.99 |
| 2009/0160976 | A1* | 6/2009 | Chen | H04N 5/2354 348/234 |
| 2009/0175555 | A1* | 7/2009 | Mahowald | H04N 5/23232 382/274 |

(Continued)

FOREIGN PATENT DOCUMENTS

| | | |
|---|---|---|
| JP | H04-215633 A | 8/1992 |
| JP | H05-020036 U | 3/1993 |

(Continued)

*Primary Examiner* — Dennis Hogue
*Assistant Examiner* — Euel Cowan
(74) *Attorney, Agent, or Firm* — Canon U.S.A., Inc. IP Division

(57) ABSTRACT

An image capturing apparatus includes an image capturing unit, a control unit, and a notification unit. The control unit controls the image capturing unit so that a first shooting operation and a second shooting operation are sequentially performed at an interval not smaller than a predetermined time period. The notification unit issues a notification constantly during the predetermined time period of the interval.

24 Claims, 24 Drawing Sheets

(56) References Cited

U.S. PATENT DOCUMENTS

| | | | | |
|---|---|---|---|---|
| 2010/0271501 A1* | 10/2010 | Ooishi | ................... | H04N 5/144 |
| | | | | 348/222.1 |
| 2011/0008036 A1* | 1/2011 | Takatsuka | .............. | G03B 15/00 |
| | | | | 396/283 |
| 2011/0221911 A1* | 9/2011 | Kang | ................ | H04N 5/23219 |
| | | | | 348/207.99 |
| 2011/0317765 A1* | 12/2011 | Fukata | ................ | H04N 19/103 |
| | | | | 375/240.16 |
| 2013/0201359 A1* | 8/2013 | Wu | ................... | H04N 5/23219 |
| | | | | 348/222.1 |
| 2014/0368669 A1* | 12/2014 | Talvala | ................... | G06T 7/194 |
| | | | | 348/207.1 |

FOREIGN PATENT DOCUMENTS

| | | |
|---|---|---|
| JP | H07-044980 U | 12/1995 |
| JP | 8-160492 A | 6/1996 |
| JP | 2000-278594 A | 10/2000 |
| JP | 2001-352491 A | 12/2001 |
| JP | 2004-118102 A | 4/2004 |
| JP | 2004260304 A | 9/2004 |
| JP | 2006-276262 A | 10/2006 |
| JP | 2007017712 A | 1/2007 |
| JP | 2010-134092 A | 6/2010 |
| JP | 2012-186646 A | 9/2012 |
| JP | 2013-197673 A | 9/2013 |

* cited by examiner

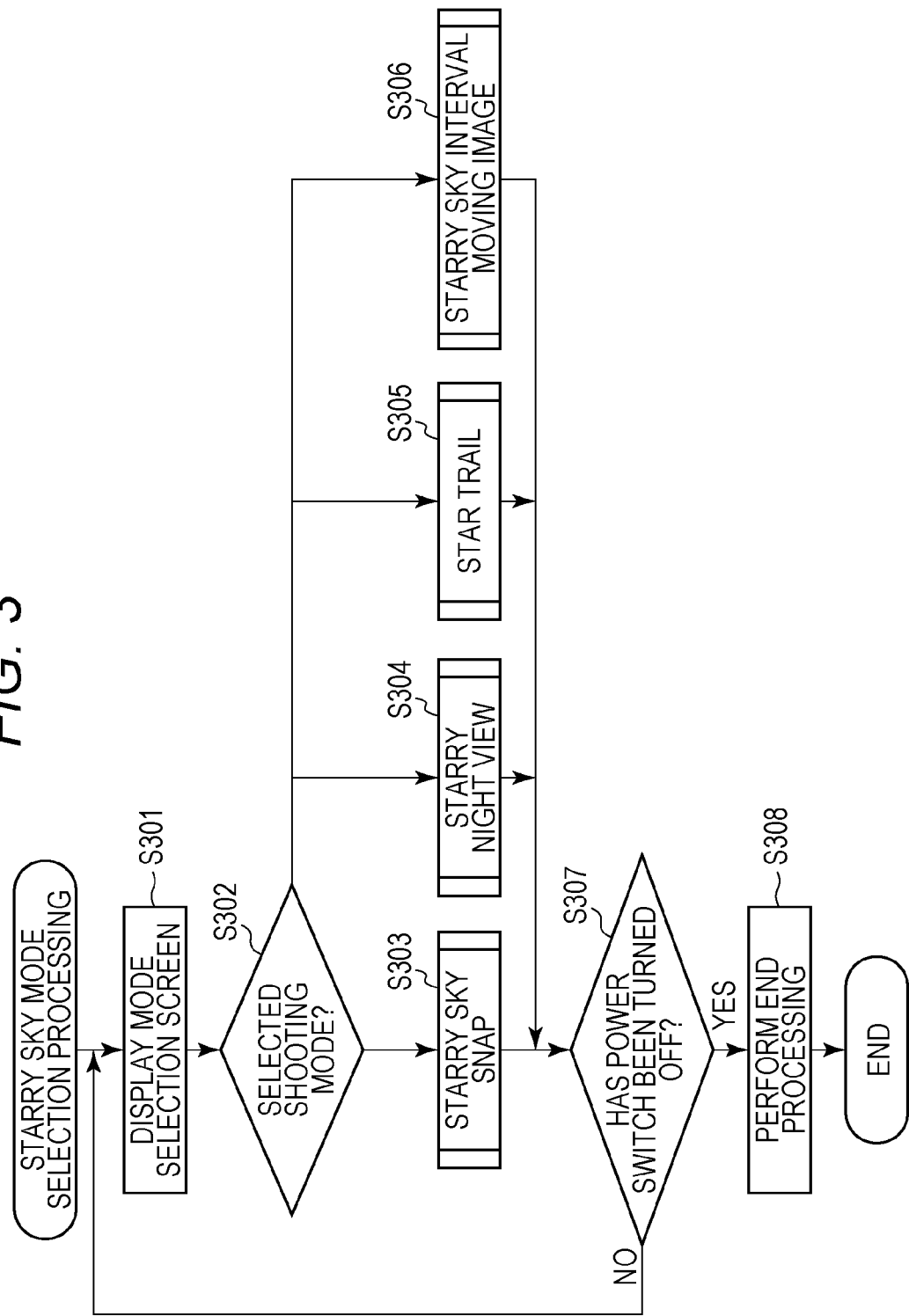

IMAGE CAPTURING APPARATUS AND METHOD FOR CONTROLLING THE SAME

BACKGROUND OF THE INVENTION

Field of the Invention

The present invention relates to notification of operations of an image capturing apparatus that performs shooting suitable for portrait shooting a plurality of times.

Description of the Related Art

The recent development in the sensitivity of image capturing apparatuses has extended shooting scenes, and there has been desired a method accordingly with which a wide range of users can easily shoot special scenes such as a starry sky, which have been difficult to shot by an existing method. Further, there is a growing need as well for ceremonial photographs that can be performed in a simple manner with a starry sky as a background.

Patent Literature 1, Japanese Patent Application Laid-Open No. 8-160492, proposes a method of shooting a person at night using a self-timer by performing long-term shooting of a night view while the operational period of time of the self-timer is being displayed and then shooting the person with an electronic flash turned on. With the method, continuous lightning display is carried out first while the first exposure, so that a person to be shot can get ready for a long-exposure period of time, knowing that he/she is about to be shot. An electronic flash shooting is performed thereafter.

In the method disclosed in Japanese Patent Application Laid-Open No. 8-160492, a person as an object of shooting is supped to wait in a shooting range during long exposure not using electronic flash. This method can cause object blurring if he/she has made any kind of motion in the long-exposure. In order to prevent the blurring, there is considered another method, in which a person as an object moves out of a shooting range between shootings so that he/she is out of the shooting range during the long-exposure. This method, however, is disadvantageous as well in that it is difficult for an object to move at an appropriate timing between shootings.

SUMMARY OF THE INVENTION

In view of the above problems, an image capturing apparatus works towards allowing a person to move at a more appropriate timing between shootings in a case where a series of shootings are performed in a row, the shootings including a shooting of a person and a long-exposure shooting.

According to an aspect of the present invention, an image capturing apparatus includes an image capturing unit, a control unit configured to control the image capturing unit so that a first shooting operation and a second shooting operation are sequentially performed at an interval not smaller than a predetermined time period, and a notification unit configured to issue a notification constantly during the predetermined time period of the interval.

Further features of the present invention will become apparent from the following description of exemplary embodiments (with reference to the attached drawings).

BRIEF DESCRIPTION OF THE DRAWINGS

FIG. 3 is a flowchart illustrating starry sky mode selection processing according to the embodiment;

DESCRIPTION OF THE EMBODIMENTS

An exemplary embodiment of the present invention will be described in detail below with reference to the accompanying drawings.

It is to be noted that the following exemplary embodiment is merely one example for implementing the present invention and can be appropriately modified or changed depending on individual constructions and various conditions of apparatuses to which the present invention is applied. Thus, the present invention is in no way limited to the following exemplary embodiment. An embodiment for carrying out the present invention will be hereinafter described in detail with reference to accompanying drawings.

[First Embodiment]

<Apparatus configuration> Reference will be made to FIGS. 1A, 1B, and 2 to describe the functions and external appearance of an image capturing apparatus (a digital camera is taken as an example thereof in this embodiment) according to this embodiment to which the present invention is applied.

Figure 1A:
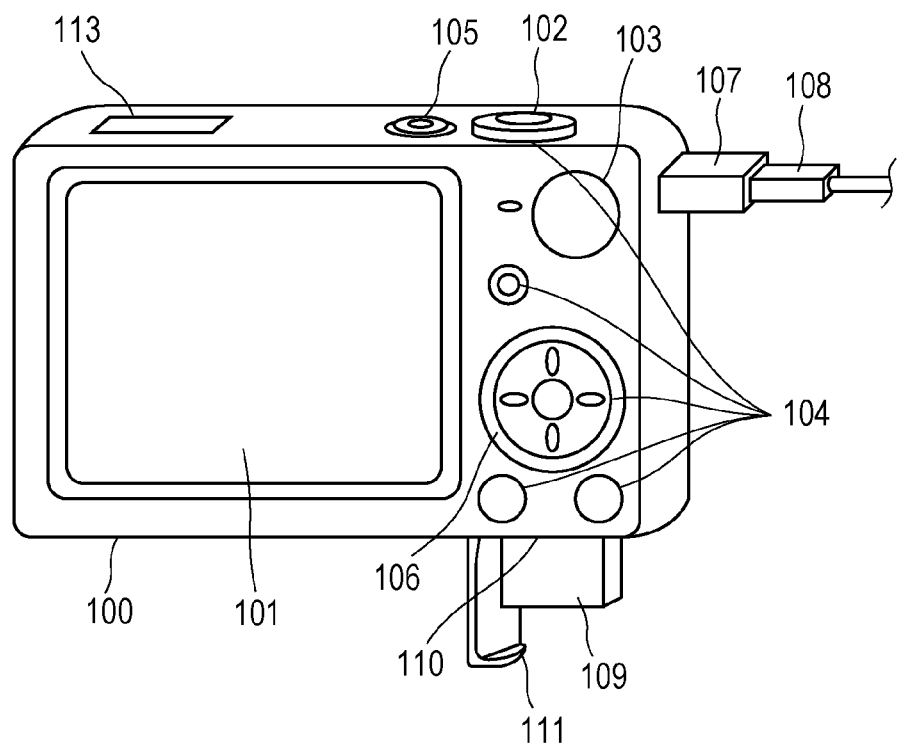
FIG. 1A is a view showing the outer appearance of an image capturing apparatus according to an embodiment when viewed from the back.
Figure 1B:
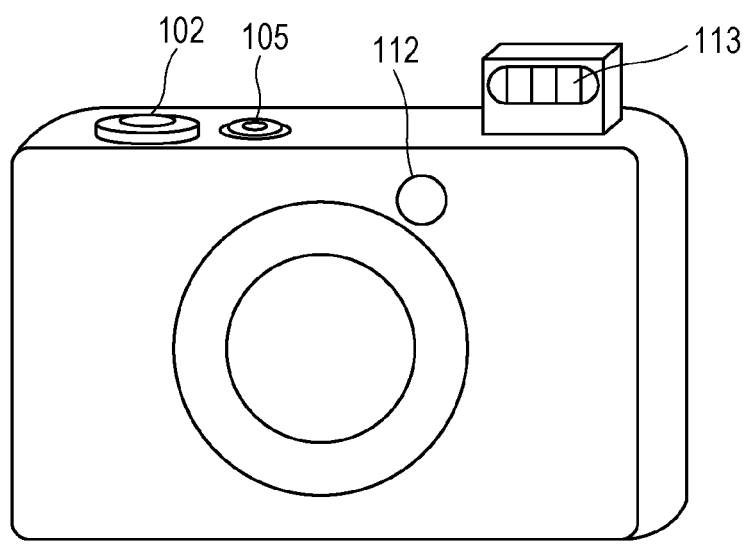
FIG. 1B is a view showing the outer appearance of the image capturing apparatus according to the embodiment when viewed from the front.

In FIGS. 1A and 1B, which show an external appearance of a digital camera 100 according to the present embodiment, a display unit 101 displays images and various information. A shutter-release button 102 is an operation unit for shooting. A mode switching button 103 is an operation unit for changing among various modes. A connector 107 is an interface that connects a connection cable 108 with the digital camera 100. Operation units 104 comprise operation members such as various switches, buttons and a touch panel operated in various ways by the user. A controller wheel 106 is a rotatable operation member included among the operation units 104. A power switch 105 switches between power on and power off. A recording medium 109 is a medium such as a memory card or hard disk. A recording medium slot 110 is for accommodating the recording medium 109. The recording medium 109 accommodated in the recording medium slot 110 makes it possible to communicate with the digital camera 100. A cover 111 covers the recording medium slot 110.

A light emitting unit 112 is formed by an LED (Light Emitting Diode) and the like, and provides a notification of the operation status (for example, a status in which the count-down operation of a self-timer is in progress, or the start/end of shooting) of the digital camera 100 to an object existing in front of the camera by a predetermined light emission/non-light emission pattern. The light emitting unit 112 is arranged on the front surface (object side or image capturing surface side) of the camera so as to be visually perceived from the object side. An electronic flash 113 includes a retractable flash device which flashes to illuminate the object, and is displaced from a storage (non-use) status (FIG. 1A) to an exposure (use) status (FIG. 1B) in response to a user operation, or is automatically displaced in a program AE mode.

Figure 2:
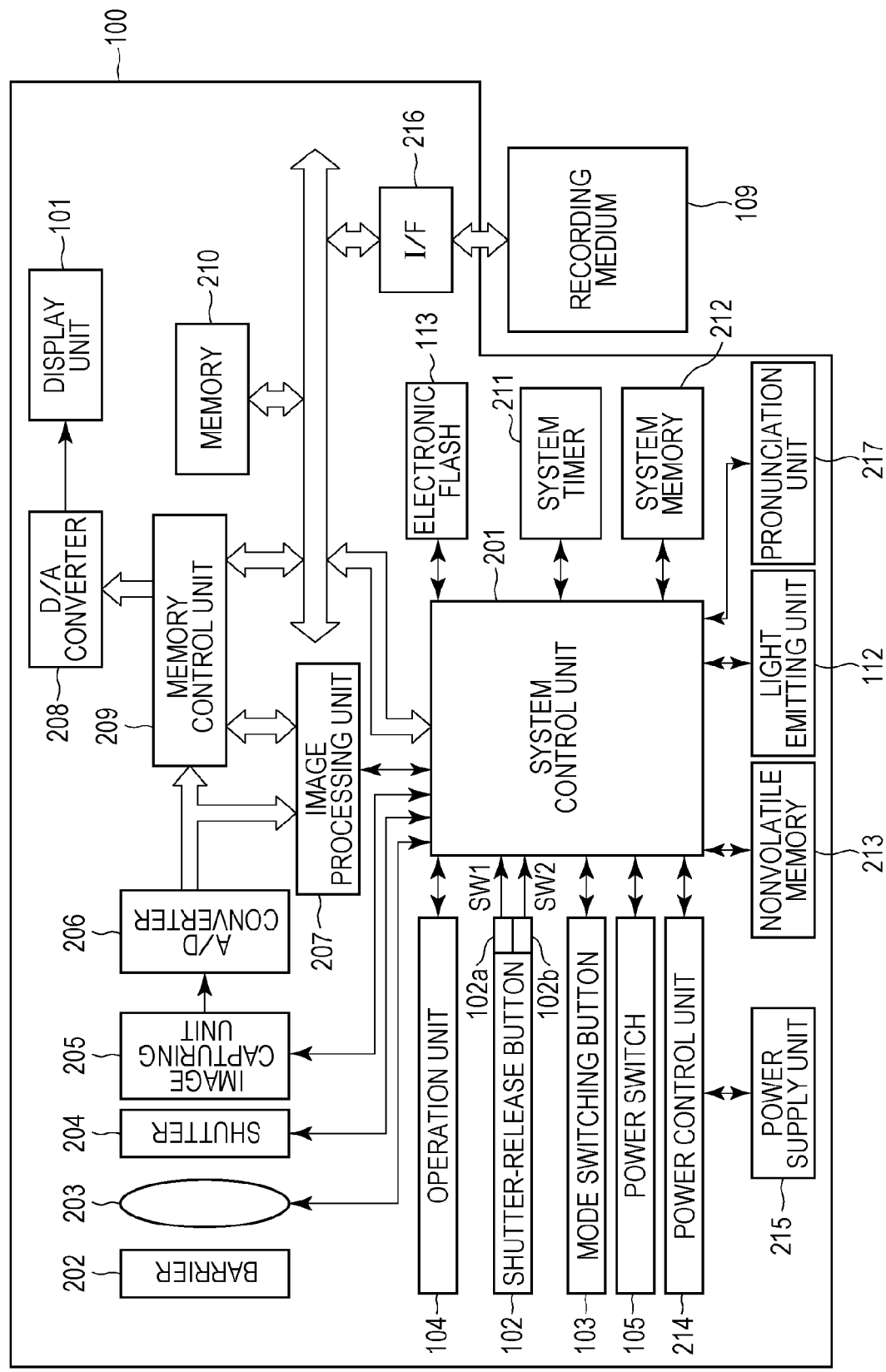
FIG. 2 is a block diagram showing the configuration of the image capturing apparatus according to the embodiment.

In FIG. 2 which shows an internal configuration of a digital camera 100 according to the present embodiment, a photographing lens 203 includes a zoom lens and a focusing lens. A shutter 204 has a diaphragm function. An image capturing unit 205 is an image sensor, which is constituted by a CCD or CMOS or the like, for converting the optical image of a subject to an electric signal. An A/D converter 206 converts an analog signal to a digital signal. The A/D converter 206 is used to convert an analog signal, which is output from the image capturing unit 205, to a digital signal. A barrier 202 covers the image capturing system (which includes the photographing lens 203) of the digital camera 100, thereby preventing contamination of and damage to the image capturing system that includes the photographing lens 203, shutter 204 and image capturing unit 205.

An image processing unit 207 performs resizing processing, such as predetermined pixel interpolation and reduction, and color conversion processing, with respect to data from the A/D converter 206 or data from a memory control unit 209. Further, the image processing unit 207 performs predetermined calculation processing using the captured image data, and the system control unit 201 performs exposure control and distance measuring control based on the calculation results. Thus, AF (Automatic Focus) processing, AE (Automatic Exposure) processing, and EF (flash pre-emission) processing of TTL (Through the Lens) type are performed. Furthermore, the image processing unit 207 performs predetermined calculation processing using the captured image data, and AWB (Automatic White Balance) processing of TTL type is performed on the basis of the calculation results.

The data from the A/D converter 206 is directly written into a memory 210 via both the image processing unit 207 and the memory control unit 209 or via the memory control unit 207. The memory 210 stores the image data obtained from the image capturing unit 205 and the A/D converter 206, and image display data to be displayed on the display unit 101. The memory 210 has a storage capacity that is sufficient for storing a predetermined number of still images as well as moving images and audio for a predetermined time period.

The memory 210 also functions as a memory for image display (video memory). A D/A converter 208 converts the image display data stored in the memory 210 into an analog signal and supplies the display unit 101 with the analog signal. The image display data that was written into the memory 210 is displayed by the display unit 101 via the D/A converter 208. The display unit 101 performs, on a display device such as an LCD, display in accordance with the analog signal from the D/A converter 208. By converting digital signals once converted by the A/D converter and stored in the memory 210 into analog signals by the D/A converter and successively transmitting analog signals to the display unit 101 so as to be displayed, it is possible to realize an electronic view finder (EVF) functionality and to perform through image display (live view display).

Note that the through image is rephrased into a live view image, and the through image display is rephrased into a live view. In other words, the terms "live view image" and "through image" are interchangeable.

A nonvolatile memory 213 is, for example, an EEPROM, which is electrically erasable and recordable. In the nonvolatile memory 213, constants and programs, for example, for operating the system control unit 201 are stored. In this context, "programs" may refer to programs for executing various flowcharts that will be described later.

The system control unit 201 is a calculation processing device for overall controlling the entire camera 100, and realizes, by executing the programs stored in the nonvolatile memory 213, the procedures of the flowcharts that will be described later. The system memory 212 is, for example, a RAM and used also as a work memory where constants and variables for operating the system control unit 201, and the programs read out from the nonvolatile memory 213 are expanded. The system control unit 201 controls the memory 210, the D/A converter 208, the display unit 101, and the like, so as to perform display control.

A system timer 211 is a timer circuit for measuring time periods for various types of controls and the time of an integrated clock.

A mode switching button 103, a first shutter switch 102a, a second shutter switch 102b, and the operation units 104 are operation members for inputting various types of instructions into the system control unit 201.

The mode switching button 103 switches the operation mode of the system control unit 201 to any of a still image shooting mode, a moving image recording mode, and a reproduction mode. The still image shooting mode includes an automatic shooting mode, an automatic scene determination mode, a manual mode, various types of scene modes in which different settings are configured for individual shooting scenes, a program AE mode, a custom mode, and the like. Using the mode switching button 103, the mode is directly switched to any of the plurality of modes included in the still image shooting mode. Alternatively, it is also possible to switch, using the mode switching button 103, to the still image shooting mode and then to switch, using another operation member, to any of the plurality of modes included in the still image shooting mode. Similarly, also the moving image recording mode may include a plurality of modes.

While the shutter button 102 provided on the camera 100 is being operated, that is, pressed half-way (the shooting preparation instruction), the first shutter switch 102a is turned on and generates a first shutter switch signal SW1. Upon receiving the first shutter switch signal SW1, the system control unit 201 causes the image processing unit 207 to start the AF (Automatic Focus) processing, the AE (Automatic Exposure) processing, the AWB (Automatic White Balance) processing, the EF (flash pre-emission) processing and the like.

When the operation of the shutter button 102 is completed, that is, the shutter button 102 is pressed fully (the shooting instruction), the second shutter switch 102b is turned on and generates a second shutter switch signal SW2. Upon receiving the second shutter switch signal SW2, the system control unit 201 starts a series of shooting processing from reading out the signal from the image capturing unit 205 to writing of image data to the recording medium 109 (shooting control).

By selecting various functional icons displayed on the display unit 101, appropriate functions for each situation are assigned to the operation units 104, and the operation units 104 thus act as various function buttons. Examples of these function buttons include an end button, a back button, an image scrolling button, a jump button, a narrow-down button, an attribute change button. For example, a notification for a menu switching instruction is given and a menu screen that enables various settings to be made is displayed on the display unit 101 by pressing a menu button. The user can make various settings intuitively by using the menu screen, which is displayed on the display unit 101, four-direction (up, down, left, right) buttons and a SET button.

Included among the operation units 104 is also a touch panel as a touch detecting unit capable of detecting a touch operation on the display unit 101. The touch panel and the display unit 101 can be constructed as a single integrated unit. For example, the touch panel is constructed in such a manner that the transmittance of light will not interfere with the display presented by the display unit 101, and it is attached to the uppermost layer of the display face of the display unit 101. In addition, input coordinates on the touch panel and display coordinates on the display unit 101 are correlated. As a result, a GUI can be constructed that makes it possible for the user to directly manipulate the screen displayed on the display unit 101.

The controller wheel 106, which is a rotatable operation member included among the operation units 104, is used together with the direction buttons as when a selection item is specified. When the controller wheel 106 is turned, an electrical pulse signal is generated in accordance with the amount of rotation, and the system control unit 201 controls each unit of the digital camera 100 based upon the pulse signal. The angle through which the controller wheel 106 has been turned and how many times it has been turned can be determined by the pulse signal. It should be noted that the controller wheel 106 can be any operating member so long as it is an operating member whose rotation can be detected. For example, it can be a dial operating member in which the controller wheel 106 per se is rotated to generate the pulse signal in accordance with a turning operation by the user. Further, it can be a device (a so-called touch wheel) that detects an operation such as the revolution of the user's finger on the controller wheel 106 without by controller wheel 106 itself being rotated.

A power control unit 214 is constituted by, for example, a battery detection circuit, a DC-DC converter, a switch circuit for changing over the block to be supplied with power, and detects whether a battery has been inserted or not, the type of the battery, and the residual capacity thereof. Further, the power control unit 214 controls the DC-DC converter in accordance with the detection results and an instruction of the system control unit 201, and supplies a necessary voltage for a necessary length of time to each of the units including the recording medium 109.

A power supply unit 215 comprises a primary battery such as an alkaline battery or a lithium battery, a secondary battery such as an NiCd battery, an NiMH battery, or an Li battery, or an AC adaptor. The recording medium interface (I/F) 216 is for interfacing with the recording medium 109 such as the memory card or hard disk. The recording medium 109 is a recording medium such as a memory card for recording shot images, and constituted by a semiconductor memory, a magnetic disk, or the like.

A pronunciation unit 217 includes a loudspeaker which pronounces the count-down sound of the self-timer, shutter sounds in synchronism with opening/closing of the shutter, other operation sounds, the sound of a moving image when it is reproduced, and the like.

In addition to the above components, a communication unit for transmitting/receiving video and sound to/from an external device communicably connected via a wireless antenna or wired cable may be incorporated. In this case, the communication unit is also connectable to a wireless LAN and the Internet, and can transmit an image (including a through image) captured by the image capturing unit 205 and an image file recorded in the recording medium 109 to an external device, and receive image data and other various kinds of information from an external device.

Furthermore, an orientation detection unit such as an acceleration sensor or gyro sensor for detecting the orientation of the digital camera 100 with respect to the gravity direction may be incorporated. In this case, based on the orientation detected by the orientation detection unit, it is possible to discriminate whether an image captured by the image capturing unit 205 has been shot by setting the digital camera 100 in the landscape or portrait direction. The system control unit 201 can add information about the orientation detected by the orientation detection unit to the image file, and rotate and record the shot image.

The digital camera 100 can be used by switching between at least a reproduction mode used to reproduce an image and a shooting mode used to shoot an image. The shooting mode includes an auto mode, manual mode, and a plurality of scene-specific shooting modes. The auto mode is a mode in which a program installed in the digital camera 100 automatically determines various parameters of the camera based on a measured exposure value. The manual mode is a mode in which the user can freely change various parameters of the camera. The scene-specific shooting mode is a shooting mode implemented for each shooting scene by combining a shutter speed, f-number, the status of flash emission, sensitivity setting, white balance (WB) setting, and the like which are suited to the shooting scene. The digital camera 100 includes the following scene-specific shooting modes (1) to (14). Note that the scene-specific shooting modes are not limited to these.

(1) Water shooting mode (beach mode): a mode capable of performing shooting without darkening a person or the like even on the sea or a sandy beach with strong sunlight reflection.

(2) Nightscape shooting mode: a mode specialized in a nightscape scene to emit flash light to a person and record the background at a low shutter speed.

(3) Skyrocket shooting mode: a mode to vividly shoot skyrocket at an optimum exposure.

(4) Underwater shooting mode: a mode to set a white balance optimum for underwater shooting and perform shooting while suppressing tinges of blue.

(5) Sunset shooting mode: a mode to perform shooting by emphasizing a silhouette and red.

(6) Portrait shooting mode: a mode specialized in shooting a person by blurring the background so that the person stands out.

(7) Sports shooting mode: a shooting mode to make settings specialized in shooting a quickly moving object.

(8) Snow shooting mode: a mode to perform shooting without darkening a person even in a snow scene and leaving tinges of blue.

(9) Night & snap shooting mode: a mode suited to clear shooting of a nightscape and person without using a tripod.

(10) Spotlight shooting mode: a mode to clearly shoot an object under a spotlight.

(11) Starry sky snap mode: a mode to shoot the starry sky and a person together.

(12) Star Nightscape mode: a mode capable of readily shooting the starry sky.

(13) Star trail mode: a mode to record star trails according to the diurnal motion by compositing images obtained by long-exposure shooting in the respective shooting operations of interval shooting.

(14) Starry sky interval moving image mode: a mode to generate a fast-forwarding moving image by forming a moving image file from still images shot at a predetermined interval.

The starry sky snap mode, Star Nightscape mode, star trail mode, and starry sky interval moving image mode will be collectively referred to as starry sky modes hereinafter. Note that the starry sky mode as a shooting mode of an upper layer may be set, and then any one of the shooting modes (starry sky snap mode, Star Nightscape mode, star trail mode, and starry sky interval moving image mode) as lower layers included in the starry sky mode may be set. The user can perform shooting by setting the digital camera 100 to a desired shooting mode from a shooting mode selection menu (shooting mode setting). All the starry sky modes are shooting modes for a dark place, which are used to perform shooting in a dark place.

<Starry Sky Mode Selection Processing> Starry sky mode selection processing according to the embodiment will be described with reference to FIG. 3. Note that processing shown in FIG. 3 is implemented when a program recorded in the nonvolatile memory 213 is read out into the system memory 212, and executed by the system control unit 201. The processing shown in FIG. 3 starts when the digital camera 100 starts and a starry sky mode selection instruction (screen display) is input through the operation units 104 (by pressing a DISP button included in the operation units 104) while one of the above-described starry sky modes is set.

In step S301, the system control unit 201 displays a starry sky mode selection screen (FIG. 4B) on the display unit 101.

In step S302, the system control unit 201 determines a selected shooting mode. If the starry sky snap mode has been selected, the process advances to step S303. If the Star Nightscape mode has been selected, the process advances to step S304. If the star trail mode has been selected, the process advances to step S305. If the starry sky interval moving image mode has been selected, the process advances to step S306. The starry sky snap mode in step S303 will be described later with reference to FIGS. 5A to 5D and 6A to 6G. The Star Nightscape mode in step S304 will be described later with reference to FIGS. 7A to 7C. The star trail mode in step S305 will be described later with reference to FIGS. 8A to 8D and 9A to 9C. Note that since a moving image file is generated in the starry sky interval moving image mode in step S306, no shutter sound is output in each shooting operation. The user can set a shooting interval (for example, an interval of 1 min) and a required shooting time (shooting of two hrs). Even if the required shooting time is not reached, the user can stop recording by pressing the moving image recording button of the operation units 104. Between shooting operations, a rec review image and an elapsed shooting time are displayed on the display unit 101. The review image is not displayed for the purpose of power saving after a predetermined time elapses. In menu settings, it is possible to set to record a still image together with a moving image.

The user starts and stops shooting of a starry sky interval moving image (Star Time-lapse Movie) by operating the moving image recording button of the operation units 104. When the user presses the shutter-release button 102 in a shooting standby status, he/she can shoot a still image at the same settings as those for moving image shooting. Therefore, it is possible to readily perform exposure adjustment and the like without recording any moving image.

In step S307, the system control unit 201 determines whether the power switch has been turned off. If the power switch has been turned off, the process advances to step S308; otherwise, the process returns to step S301.

In step S308, the system control unit 201 executes end processing. The end processing includes, for example, processing of changing display of the display unit 101 to an end status and closing the barrier 202 to protect the image capturing unit 205. The end processing may include processing of recording parameters including a flag and control variable, set values, and a set mode in the nonvolatile memory 213 and interrupting power supply to parts which do not require power supply.

Upon completion of the end processing in step S308, the apparatus transits to a power-off status.

Note that since the starry sky mode is a mode to perform wide-angle shooting, the system control unit 201 may fix the photographing lens 203 at the wide-angle end at the start of processing in the starry sky mode. When the user selects the starry sky mode or one of the starry sky modes, the system control unit 201 may display the following guidance on the display unit 101.

Information indicating that the selected mode is a mode to shoot the starry sky.

Advice for performing shooting by fixing the camera using a tripod. (In the starry sky mode, an exposure time is long because of shooting in a dark place, and thus camera shake readily occurs if shooting is performed while holding the camera by hands, thereby recommending shooting by fixing the camera using a tripod. That is, the starry sky mode assumes the use of a tripod.)

An instruction for fixing a zoom lens at the wide-angle end to perform wide-angle shooting.

<Starry Sky Mode Selection Screen> A screen displayed on the display unit 101 in the starry sky mode according to the embodiment will be described with reference to FIGS. 4A and 4B.

Figure 4A:
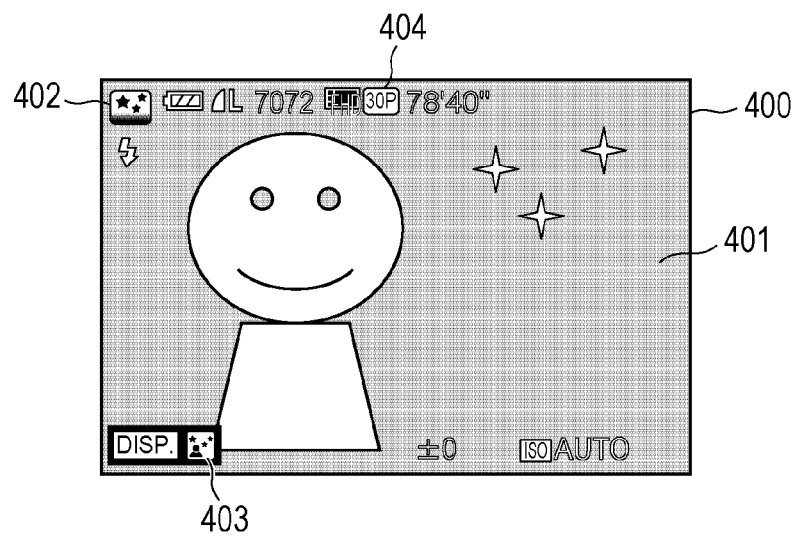
FIGS. 4A and 4B are views each exemplifying a starry sky mode selection screen according to the embodiment.

FIG. 4A exemplifies the starry sky mode selection screen. On the display unit 101, a shooting condition (shooting setting) information 404 and a shooting mode icon 402 indicating that the starry sky mode is currently selected are superimposed and displayed as OSD (display items) on a through image 401. Furthermore, a starry sky mode icon 403 indicating the current shooting mode and an operation method of selecting the starry sky snap mode, Star Nightscape mode, star trail mode, or starry sky interval moving image mode among the starry sky modes is superimposed and displayed on the through image 401. The shooting information 404 includes icons indicating the current settings and status of the digital camera 100 which are the remaining battery level, the recording image quality (compression ratio and image size), and the number of recordable images from the left.

The shooting mode icon 402 indicates the shooting mode set in the digital camera 100 and is displayed at the upper left position. The starry sky mode icon 403 represents the currently selected mode among the starry sky modes set in the digital camera 100. The starry sky mode icon 403 also serves as guidance indicating that it is possible to display a switching dialog for setting one of the starry sky modes by pressing the DISP button of the operation units 104.

Figure 4B:
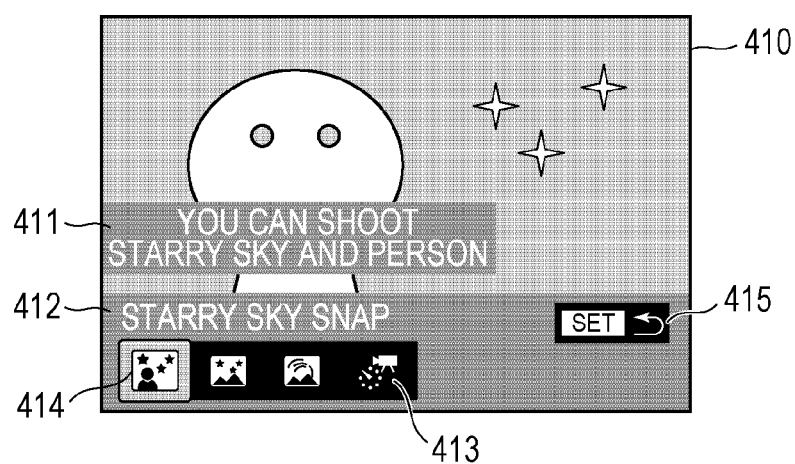

FIG. 4B shows a display example of a screen for selecting one of the starry sky modes in the shooting standby status in the starry sky mode. This screen is displayed when the DISP button of the operation units 104 is pressed while the screen of FIG. 4A is displayed.

In the starry sky mode selection screen, guidance 411 of the selected shooting mode, a mode name 412 of the selected shooting mode, an icon 414 of the currently selected shooting mode, and a mode list 413 of a plurality of shooting modes are displayed. In the starry sky mode selection screen, an operation guide 415 for displaying information indicating that the screen returns to the initial screen shown in FIG. 4A is displayed by pressing the SET button of the operation units 104. The user can select an arbitrary one of the starry sky modes by operating the left or right button (left or right key) of a 4-way selector included in the operation units 104 while the screen is displayed. When the user presses the SET button included in the operation units 104 while an arbitrary mode is selected, the selected mode is set. In this way, the user can set an arbitrary one of the starry sky modes.

With such a screen display, for example, it is possible to readily switch between the portrait shooting mode and the starry sky mode, and to select the starry sky snap mode, Star Nightscape mode, star trail mode, or starry sky interval moving image mode among the starry sky modes.

<Starry Sky Snap Mode> Processing in the starry sky snap mode in step S303 of FIG. 3 will be described with reference to FIGS. 5A to 5D.

In step S500, the system control unit 201 displays the initial screen (FIG. 6A) of the starry sky snap mode on the display unit 101.

Figure 6A:
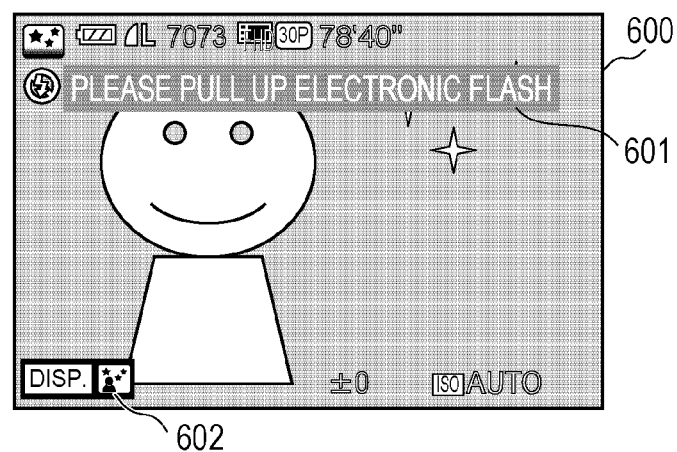
FIGS. 6A to 6G are views each showing a display example of a screen in the starry sky snap mode according to the embodiment.

In step S501, the system control unit 201 determines whether the electronic flash 113 is exposed. If the electronic flash 113 is exposed, the process advances to step S502, and guidance "please pull up electronic flash" shown in FIG. 6A is set in a non-display status. On the other hand, if the electronic flash 113 is not exposed, the process advances to step S503.

In step S503, the system control unit 201 determines whether the DISP button of the operation units 104 has been pressed to perform an operation of selecting another starry sky mode. If the DISP button has been pressed, the process advances to step S504, and the starry sky mode selection processing described with reference to FIG. 3 is performed. If no DISP button has been pressed, the process advances to step S505.

Figure 6B:
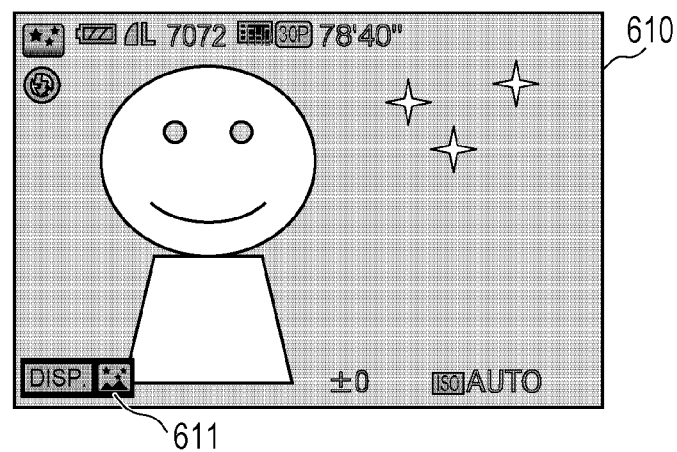
Figure 6C:
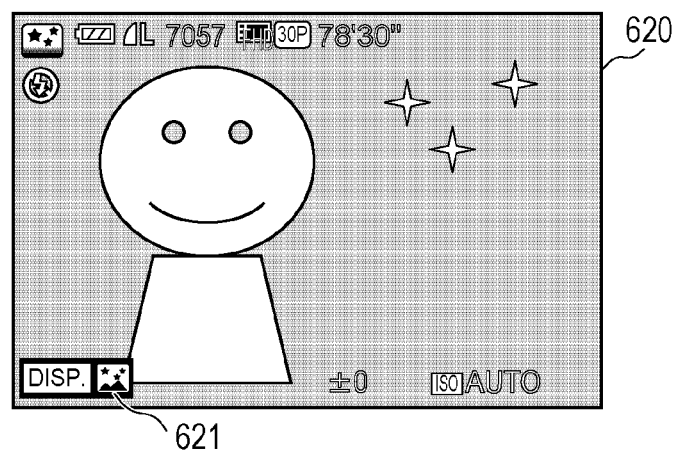

In step S505, the system control unit 201 determines whether a menu screen has been displayed by a user operation and an operation of switching ON/OFF of dark place display has been performed using a menu item of dark place display (a display mode for a dark place). If a switching operation has been performed, the process advances to step S506, and dark place display setting switching processing is executed. If no switching operation has been performed, the process advances to step S507. Note that dark place display is settable by a menu item even in a mode other than the starry sky mode, such as the program AE mode, aperture priority mode, shutter-speed priority mode, manual mode, nightscape shooting mode, or skyrocket shooting mode which assumes shooting in a dark place. FIG. 6B shows a display example of the screen in the shooting standby status when the dark place display setting is ON. FIG. 6C shows a display example of the screen in the shooting standby status when the dark place display setting is OFF. Note that a case in which ON/OFF of the dark place display setting is switched by a user operation has been explained. However, ON/OFF of the dark place display setting may be automatically switched by detecting the ambient environment. If, for example, a dark place is determined since the luminance of a shot through image is low, the dark place display setting may be automatically turned on. If no dark place is determined since the luminance of the through image is high, the dark place display setting may be automatically turned off.

Figure 6D:
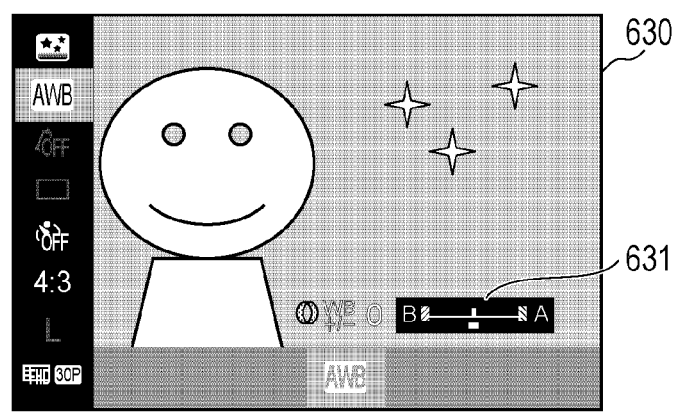

In step S507, the system control unit 201 determines whether a white balance correction operation has been performed through the operation units 104. If a white balance correction operation has been performed, the process advances to step S508, and a white balance correction setting is made. FIG. 6D exemplifies a setting screen at the time of white balance correction. If no white balance correction operation has been performed, the process advances to step S509.

In step S508, the system control unit 201 holds, in the memory 210, a white balance correction value set through the operation units 104, and controls to apply the correction value to the image capturing unit 205 and the image processing unit 207. With this processing, an image obtained by reflecting white balance correction is displayed on the display unit 101.

In step S509, the system control unit 201 determines whether an exposure correction operation has been performed through the operation units 104. If an exposure correction operation has been performed, the process advances to step S510, and an exposure correction setting is made. If no exposure correction operation has been performed, the process advances to step S511.

In step S510, the system control unit 201 holds, in the memory 210, an exposure correction value set through the operation units 104, and controls to apply the correction value to the image capturing unit 205 and the image processing unit 207, thereby displaying, on the display unit 101, an image obtained by reflecting exposure correction.

In step S511, the system control unit 201 determines whether a self-timer setting operation has been performed through the operation units 104. If a self-timer setting operation has been performed, the process advances to step S510, and a self-timer setting is made according to the setting operation. If no self-timer setting operation has been performed, the process advances to step S513.

In step S512, the system control unit 201 holds, in the memory 210, self-timer setting seconds set through the operation units 104. Note that the setting seconds held in the memory 210 may be recorded in the nonvolatile memory 213 upon power-off, and the setting may be maintained at the next activation timing.

The self-timer setting includes:
- a 2-second timer (a first time) mainly used for the purpose of camera shake prevention;
- a 10-second timer (a second time) mainly used to gain time for the photographer to move into the shooting range so as to be shot as an object; and
- a custom timer used to arbitrarily set a shooting interval and the number of images to be shot.

Note that shooting in the starry sky mode is often performed in a dark place, and thus a shutter speed is often set low (an exposure time is set long). Consequently, a camera shake readily occurs. It is, therefore, assumed that self-timer shooting is often performed in the starry sky mode to prevent a camera shake. In the starry sky mode, the setting status of the self-timer is recorded as a starry sky mode setting in the nonvolatile memory 213 to maintain the same self-timer setting at the next activation timing of the starry sky mode after power-off. This processing enables the user who basically uses self-timer shooting in the starry sky mode to omit the labor to perform a self-timer setting operation every time the starry sky mode is activated. The self-timer setting for the starry sky mode is not used when a shooting mode other than the starry sky mode is activated. Also, in a shooting mode other than the starry sky mode, the self-timer setting is not recorded in the nonvolatile memory 213. That is, at the next activation timing after power-off, the self-timer setting is set OFF as an initial setting irrespective of the previous setting. This can prevent a situation in which at the next power-on timing at which a shooting scene has probably changed, self-timer shooting is performed without intention since self-timer shooting was performed before power-off, and thus the best opportunity for shooting is missed.

In step S513, the system control unit 201 determines whether a first shutter switch signal SW1 has been turned on by pressing the shutter-release button 102 halfway. If the first shutter switch signal SW1 has been turned on, the process advances to step S514; otherwise, the process returns to step S500.

In step S514, the system control unit 201 determines whether a second shutter switch signal SW2 has been turned on by fully pressing the shutter-release button 102. If the second shutter switch signal SW2 has been turned on, the process advances to step S516; otherwise, the process advances to step S515.

In step S515, the system control unit 201 determines whether the first shutter switch signal SW1 has been turned on by pressing the shutter-release button 102 halfway. If the first shutter switch signal SW1 has been turned on, the process returns to step S514; otherwise, the process returns to step S500.

In step S516, the system control unit 201 determines whether the self-timer setting is ON. If the self-timer setting is ON, the process advances to step S517; otherwise, the process advances to step S519.

In step S517, the system control unit 201 counts the setting seconds of the self-timer according to the self-timer setting determined in step S516. The system control unit 201 flickers the light emitting unit 112 to provide, to the object side, a notification that counting (count-down operation) of the self-timer is in progress. In the starry sky snap mode, it is assumed that a person and the starry sky are shot in a dark place at the same time. Therefore, the system control unit 201 flickers the light emitting unit 112 during the count-down operation of the self-timer, thereby providing, to the person as an object, a notification that the count-down operation is in progress. On the other hand, in a mode in which only the starry sky is shot in a dark place, such as the Star Nightscape mode, star trail mode, and the starry sky interval moving image mode (all of which will be described later), the light emitting unit 112 is not turned on even during the count-down operation of the self-timer. Note that pronunciation/silence of a self-timer sound for providing a notification that the count-down operation is in progress is synchronized with the flickering status and ON status/OFF status of the LED. That is, when the light emitting unit 112 is in the turn-off status, the self-timer sound is not pronounced.

Note that in a shooting mode other than the starry sky snap mode, such as the portrait shooting mode which assumes that a person is shot, the light emitting unit 112 is turned on during the count-down operation of the self-timer.

In a shooting mode which assumes that a person is shot at low probability and which is used in a dark place, such as the skyrocket shooting mode and nightscape shooting mode other than the Star Nightscape mode, the light emitting unit 112 is turned off during the count-down operation of the self-timer.

Instead of determining a dark place based on the shooting mode, in accordance with the brightness of an object based on a photometry result, when the object is dark, the system control unit 201 can determine that shooting is performed in a dark place. If it is determined that shooting is performed in a dark place, it is possible to set an operation mode for a dark place, and turn off the light emitting unit 112.

The flickering processing of the light emitting unit 112 may be performed only when a face/person can be detected, in addition to the dark place determination based on the shooting mode.

It is also possible to implement the flickering processing by combining brightness and face detection/person detection.

In accordance with the setting seconds of the self-timer, if the 2-second self-timer assumed to be used for the purpose of camera shake prevention is set, the system control unit 201 may turn off the light emitting unit 112. If the 10-second self-timer assumed to be often used to shoot a person is set, the system control unit 201 may flicker or turn on the light emitting unit 112.

In step S518, the system control unit 201 determines whether the setting seconds of the self-timer have elapsed. If the setting seconds have elapsed, the process advances to step S519; otherwise, the process returns to step S517.

In step S519, the system control unit 201 determines whether to cause the electronic flash 113 to emit light. If the system control unit 201 determines to cause the electronic flash 113 to emit light, the process advances to step S520; otherwise, the process advances to step S550 of processing in the Star Nightscape mode (to be described later with reference to FIGS. 7A to 7C). With this processing, when the electronic flash 113 is in a storage status (non-use status) in the starry sky snap mode, the same processing as that in the Star Nightscape mode (to be described later) can be performed.

In step S520, the system control unit 201 causes the pronunciation unit 217 to pronounce a shutter start sound in synchronism with the timing at which the shutter 204 opens. This enables the photographer to confirm the shooting start timing of the first shooting operation. The shutter sound includes a start sound (for example, "cli") in synchronism with the start of exposure, and an end sound (for example, "ck") in synchronism with the end of exposure. When the user continuously hears the start sound and end sound, these sounds sound like "click" which mimics the sound of a mechanical mirror flip-up operation. Based on the interval between the start sound and end sound, the user can determine whether the exposure time is long or short. For example, when the user hears "cli . . . ck", he/she can recognize that the exposure time is long.

In step S521, the system control unit 201 causes the electronic flash 113 to emit light, thereby shooting a person.

In step S522, the system control unit 201 causes the pronunciation unit 217 to pronounce the shutter end sound in synchronism with the end of exposure. This enables the photographer to confirm completion of exposure of the first shooting operation.

In step S523, the system control unit 201 causes the pronunciation unit 217 to pronounce the shutter start sound in synchronism with the timing at which the shutter 204 opens. This enables the photographer to confirm the shooting start timing of the second shooting operation. At this time, the system control unit 201 does not cause the light emitting unit 112 to emit light. If the light emitting unit 112 emits light towards the object side at this timing, light remains on the object side during exposure of the second shooting operation (step S524) and the third shooting operation (step S527) (both will be described later), thereby adversely influencing shooting. The second and third shooting operations are performed in a dark place without using the electronic flash, and thus the exposure periods are long. If the light emitting unit 112 irradiates the object with light during the exposure period, the object may be emphasized to shoot no background, or shooting may be performed while unnatural color from the light emitting unit 112 is emphasized. To prevent such situation, a shooting end notification by light emission of the light emitting unit 112 is not provided after shooting operations (the first and second shooting operations) other than the last shooting operation among a series of shooting operations in the starry sky snap mode. As another reason, if a notification of the end of the first or second shooting operation is provided to the user, he/she may misunderstand that the series of shooting operations end at that timing and thus he/she may move. In the starry sky snap mode, shooting is performed by shooting a person, shooting the background by long-exposure shooting, and multiple-compositing obtained images. However, the user issues only one shooting instruction, and thus may not know the mechanism of performing shooting a plurality of times. In this case, if a notification of the end of the first shooting operation is provided using the light emitting unit 112, the user may understand that he/she can move after the notification. As a result, the object moves during a long exposure time in the second or third shooting operation, and an image in which the object is blurred is shot. To prevent such situation, no notification by light emission of the light emitting unit 112 is provided after the end of the first or second shooting operation of the series of shooting operations, and the light emitting unit 112 is caused to emit light after the end of the third shooting operation, that is, the last shooting operation of the series of shooting operations.

In step S524, to extract the person shot in step S521, the system control unit 201 shoots the background without causing the electronic flash 113 to emit light.

In step S525, the system control unit 201 causes the pronunciation unit 217 to pronounce the shutter end sound in synchronism with the end of exposure. This enables the photographer to confirm completion of exposure of the second shooting operation. At this time, the system control unit 201 does not cause the light emitting unit 112 to emit light.

In step S526, the system control unit 201 causes the pronunciation unit 217 to pronounce the shutter start sound in synchronism with the timing at which the shutter 204 opens. This enables the photographer to confirm the shooting start timing of the third shooting operation.

In step S527, the system control unit 201 shoots a dark object such as the starry sky or Nightscape by performing long-exposure shooting (long-time exposure such as shooting with an exposure time of 0.5 sec or longer).

In step S528, the system control unit 201 pronounces the shutter end sound in synchronism with the end of exposure. This enables the photographer to confirm completion of exposure of the third shooting operation.

In step S529, the system control unit 201 flickers the light emitting unit 112 three times to provide, to the object, a notification that the series of shooting operations (three shooting operations) are complete. When the object does not move until he/she sees flickering of the light emitting unit 112, it is possible to shoot a photo including the starry sky and person without object blurring. Since a notification that the series of shooting operations are complete is provided to the object side by light emission in the dark place, the object away from the camera can readily, visually perceive the notification, and understand that shooting has ended. If the object can understand that shooting has ended, he/she can recognize that he/she need not keep posing within the shooting range, and may move or move outside the shooting range. By providing such notification after the end of exposure of the third shooting operation, there is no influence on long-exposure shooting. Note that it is possible to provide a notification of completion of shooting by light emission of the electronic flash, a sound, pronunciation, or the like.

It is unnecessary to flicker the light emitting unit 112 in step S529 if no self-timer setting has been made. In this case, the photographer is near the camera, and understands the operation status from the shutter sound and the screen display. Even if the camera provides no notification to the object side, the photographer can signal to the object. Furthermore, if a person (face) cannot be detected from an image shot by the first shooting operation (shooting in step S521), it is unnecessary to flicker the light emitting unit 112 in step S529. This is because it is unnecessary to provide a notification to the object side if there is no person as an object.

In step S530, in order to execute noise processing of long-exposure shooting performed in step S527, the system control unit 201 shoots a black image by long-exposure shooting by closing the shutter 204. The image processing unit 207 generates a noise-reduced image by processing the image obtained in step S527 and that obtained in step S530.

In step S531, the system control unit 201 refers to the current setting status stored in the nonvolatile memory 213 or the system memory 212, and determines whether star enhancement processing is ON. Assume that whether to perform the star enhancement processing (ON or OFF) can be set in advance according to a user operation in the menu screen. If the star enhancement processing is ON, the process advances to step S532; otherwise, the process advances to step S533.

In step S532, the system control unit 201 causes the image processing unit 207 to detect bright spots such as stars from the noise-reduced image obtained in step S530, and execute enhancement processing of, for example, enlarging the sizes of the bright spots.

In step S533, the system control unit 201 causes the image processing unit 207 to detect bright spots such as stars from the noise-reduced image obtained in step S530, and execute no enhancement processing.

In step S534, the system control unit 201 causes the image processing unit 207 to extract a person portion from the flash shooting image for shooting a person, which has been shot in step S521, and the background image shot in step S524. The system control unit 201 composites the image of the person portion on the starry sky image generated in step S532 or S533, and records the resultant image in the recording medium 109.

In step S535, the system control unit 201 determines whether a rec review setting has been made through the operation units 104. If the rec review setting has been made, the process advances to step S536; otherwise, the process advances to step S540.

In step S536, the system control unit 201 performs rec review display of the image data obtained by the shooting processing on the display unit 101. The rec review display indicates processing of displaying the image data on the display unit 101 for only a predetermined time (review time) immediately after the object is shot so as to confirm the shot image.

In step S537, the system control unit 201 determines whether a histogram display instruction has been issued through the operation units 104. If histograms are to be displayed, the process advances to step S538; otherwise, the process advances to step S539.

In step S538, the system control unit 201 calculates the histogram of the luminance of each of R, G, and B from the image data rasterized in the memory 210, and displays the calculated histograms on the display unit 101. At this time, if the dark place display setting is ON, the display data of the histograms are changed to display R, G, and B in the same color. In a normal display status, it is important to display R data in red, G data in green, and B data in blue so as to confirm an image immediately after shooting. In a dark place display status, however, since B components are reduced, it is difficult to visually perceive the histogram. To solve this problem, in dark place display on a histogram display screen as a screen including display items (OSD) displayed in blue, the R, and G, and B data are changed to the same color.

Although details will be described later, FIG. 6E exemplifies a rec review display screen when the dark place display setting is ON and the histograms are displayed, and FIG. 6F exemplifies a rec review display screen in the normal display status when the histograms are displayed.

In step S539, the system control unit 201 determines whether a rec review end condition is satisfied. If the end condition is satisfied, the rec review display is terminated, and the process advances to step S540; otherwise, the process returns to step S535 to continue the rec review display. The rec review end condition is, for example, that the review time has elapsed or that the shutter-release button 102 has been pressed halfway.

In step S540, the system control unit 201 determines whether the first shutter switch signal SW1 has been turned on by pressing the shutter-release button 102 halfway. If the first shutter switch signal SW1 has been turned on, the process advances to step S514; otherwise, the process returns to step S500.

<Starry Sky Snap Mode Screen> A screen displayed on the display unit 101 in the starry sky snap mode according to the embodiment will be described with reference to FIGS. 6A to 6G.

FIG. 6A exemplifies the initial screen of the starry sky snap mode. OSD (information such as shooting conditions) is superimposed and displayed on a through image 600 on the display unit 101. In OSD, guidance display 601 for recommending, when the electronic flash 113 is stored, to perform shooting by pulling up the electronic flash 113, and shooting mode display 602 indicating that the starry sky snap mode is currently selected are displayed.

FIG. 6B shows an example of a display screen when the dark place display setting is ON. On the display unit 101, OSD 611 is superimposed on a through image 610, and dark place display is performed by executing suitable color conversion for the dark place by multiplying data by R, G, and B gains. The R, G, and B gains are adjusted when transferring OSD (display items) expanded in the RAM to a VRAM for display.

In shooting in a dark environment such as celestial observation, it is known that the eyes of the photographer adapt to the dark environment (dark adaptation). Since dark adaptation is readily undone due to light of a wavelength close to that of blue light, it is effective to display data by reducing light of a wavelength close to that of blue light of visible light so as to maintain dark adaptation. That is, it is known that performing display by suppressing B of R, G, B as color components (performing display by suppressing tinges of blue) can make dark adaptation difficult to undo (suppress interference with dark adaptation).

In this embodiment, only the B components or B and G components are reduced by turning on the dark place display setting, thereby performing dark place display on the display unit 101 in a color like dark orange or brown. With this processing, suitable color display is performed in a dark place, which makes it possible to readily maintain visual dark adaptation of the user.

FIG. 6C shows an example of a display screen when the dark place display setting is OFF. On the display unit 101, shooting information is superimposed on a through image 620, and normally displayed as OSD 621 without performing dark place color conversion.

FIG. 6D exemplifies a white balance correction setting screen in the starry sky snap mode. On the display unit 101, a white balance adjustment tool 631 indicating that the white balance setting can be changed from a B (blue) component to an A (amber) component using the operation units 104 is superimposed and displayed, as OSD, on a through image 630.

Figure 6E:
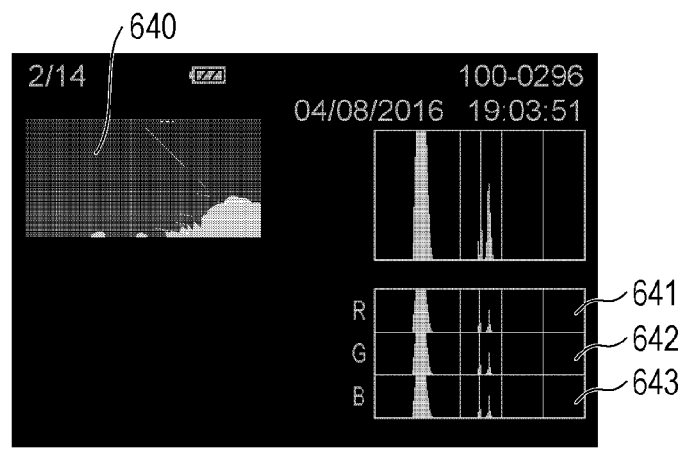

FIG. 6E exemplifies the rec review screen when the dark place display setting is ON and the histograms are displayed. On the display unit 101, OSD obtained by multiplying data by R, G, and B gains (gains which reduce B and G) for dark place display is superimposed and displayed on a rec review image 640 which has not been multiplied by R, G, and B gains for a dark place. Especially if B components 643 normally displayed in blue in the RGB histogram portion of the histogram display are multiplied by R, G, and B gains which reduce B, the visibility may significantly decrease, thereby disabling visual perception. If, for example, pixels displayed in pure blue (R=0, G=0, and B=255) are multiplied by a gain which reduces B to zero, pixels are displayed in black (R=0, G=0, and B=0) to nullify the difference from the periphery of the pixels, and thus it becomes impossible to visually perceive the histogram. To solve this problem, after changing color designation of R components 641, G components 642, and the B components 643 to the same color other than blue (more suitably, other than blue and green), the data are multiplied by R, G, and B gains which reduce B and G. For example, all the histogram portions of R, G, and B are set to white (R=255, G=255, and B=255). After that, if the data is multiplied by a gain which reduces B to zero, a reddish color (R=255, G=255, and B=0) is obtained, thereby differentiating the histogram portions from a black (R=0, G=0, and B=0) portion other than histogram portions. That is, even if B and G of a portion which is normally blue and a portion which is normally green are reduced (that is, the dark place display setting is ON), it is possible to visually perceive the portions. Note that such processing of reducing the blue components by specifying the same color other than blue is executed to perform dark place display of the screen including the OSD portion (display items) which is displayed in blue when the dark place display setting is OFF, similarly to display of the histograms. In the screen (the screen of FIG. 6C displayed during the shooting standby status) without OSD (display items) which is displayed in blue when the dark place display setting is OFF, no processing of specifying the same color is executed simply because the processing load would be heavy otherwise. Assume that the display item which is displayed in blue when the dark place display setting is OFF is a display item formed by pixels each including a B component of a predetermined value or larger (for example, a tone level of 130 or higher among 255 tone levels) and R and G components of a predetermined value or smaller (for example, a tone level of 70 or lower among 255 tone levels). Alternatively, the display item may be formed by pixels each including a B component of a predetermined value or larger and R and G components whose ratio to the B component is a predetermined value or lower. The display item may be formed by (zero) pixels each including a B component of a predetermined value or larger without R and G components. In either case, the display items displayed in blue when the dark place display setting is OFF include a display item displayed in pure blue (R=0, G=0, B=255) as described above, that is, a display item formed by pixels each including a B component of a settable maximum value without any other color components.

Note that in this embodiment, color designation of the R components 641, G components 642, and B components 643 is changed to the same color. However, only the color of the B components 643 (that is, only a pixel portion displayed in blue) whose visibility significantly decreases may be changed.

It is possible to improve the visibility when dark place display is performed even if OSD is displayed by decreasing only the gain of the B components 643 or the gains of the B components 643 and G components 642, instead of changing color designation. Note that processing of decreasing the gain of the B components (or also decreasing the gain of the G components) after changing the color of contents, which are normally displayed in blue, to a color other than blue when dark place display is performed is applicable to a device other than the digital camera. The processing is applicable to any display control apparatus having a function of decreasing the gain of the B components for dark place display. For example, the processing is applicable to a portable terminal such as a tablet PC and smartphone which can perform dark place display of a star chart used for teaching at the time of celestial observation. In this embodiment, a case in which in the screen in which OSD in pure blue exists, the OSD is displayed by replacing the color by that other than blue to reduce the B components has been explained. The processing may be applied to a shot image including a large blue portion. For example, as for a shot image in which the area ratio of pixels strongly tinged with blue is high (equal to or higher than a predetermined value), the pixels strongly tinged with blue are replaced by pixels of a color other than blue, and the G and B gains are reduced, thereby performing dark place display. Assume that the pixel strongly tinged with blue is a pixel in which the ratio of the value of B to each of R, G, and B values in the pixel is equal to or higher than a predetermined value.

Note that unlike OSD, a shot image includes pixels of pure blue (R=0, G=0, and B=255) at low probability. Therefore, instead of the above-described processing of replacing the pixels strongly tinged with blue by pixels of another color, processing of relatively amplifying (increasing) the R values of all the pixels of the shot image with respect to the G and B values may be performed, and then processing of decreasing the G and B gains may be executed, thereby performing dark place display. This also makes it possible to identify pixels strongly tinged with blue even if dark place display of the pixels is performed. In addition, in the processing of amplifying the R values, differences in density and tint between the pixels are larger than those in the processing of replacing the pixels strongly tinged with blue by pixels of the same color, thereby improving the resolution of the shot image. The processing of relatively amplifying (increasing) the R values with respect to the G and B values is processing of multiplying each of the R, G, and B values of one pixel by a coefficient, in which an R coefficient is larger than G and B coefficients. Even if such processing is performed to multiply the R values of the pixels of pure blue (R=0, G=0, and B=255) by the coefficient, the R values remain 0. This means that it is impossible to amplify R, and these pixels cannot be seen when dark place display is performed. As described above, therefore, to display OSD including pure blue (R=0, G=0, B=255), the processing of decreasing the G and B gains after performing the processing of replacing the pixels of blue by those of a color other than blue is suitable over the processing of multiplying each of R, G, and B by the coefficient by weighing R. These processes may be properly used. For example, when dark place display of OSD which includes blue when it is normally displayed is performed, the processing of replacing the pixels of blue by those of a color other than blue is executed. Alternatively, when dark place display of a shot image whose ratio of tinges of blue is high when it is normally displayed is performed, the processing of amplifying the R components of all the pixels is executed.

Figure 6F:
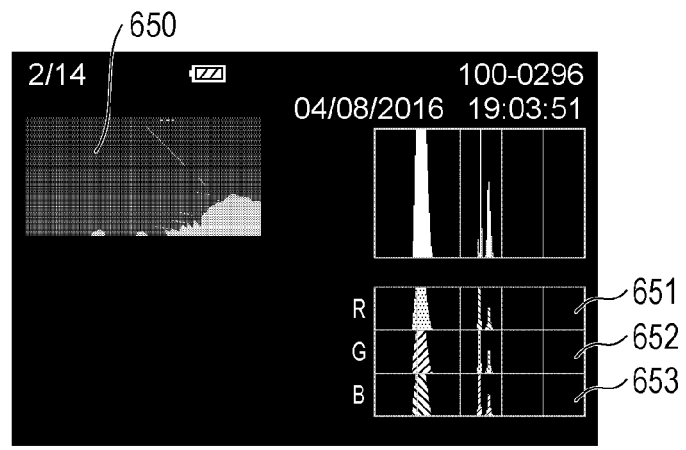

FIG. 6F exemplifies the rec review screen when the dark place display setting is OFF and the histograms are displayed. OSD and a rec review image 650 which has not been multiplied by the R, G, and B gains for dark place display are displayed on the display unit 101.

The R, G, and B histograms can be intuitively grasped by displaying R components 651 in red (R=255, G=0, and B=0), G components 652 in green (R=0, G=255, and B=0), and B components 653 in blue (R=0, G=0, and B=255) in the histograms.

Figure 6G:
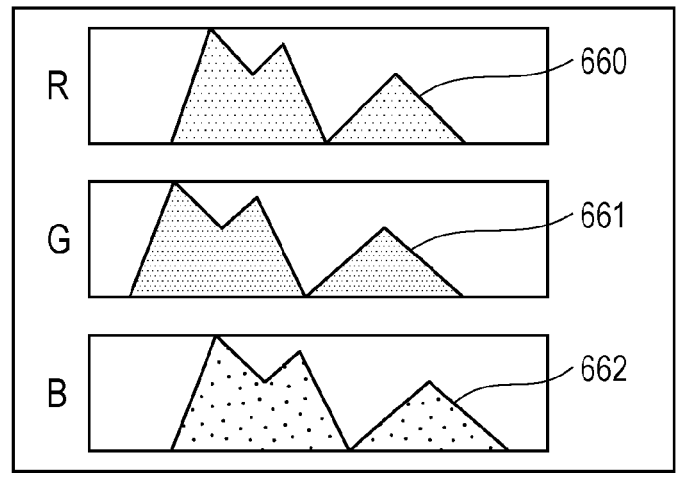

FIG. 6G exemplifies another representation method for allowing confirmation of the R, G, and B histograms when dark place display is performed. Instead of displaying the R, G, and B histograms in the same color as shown in FIG. 6E, it is possible to clearly represent the differences among R, G, and B while ensuring the visibility by using shading.

A method of making the difference among R, G, and B clear by changing the gradation directions is also usable. For example, vertical gradation is used for R, diagonal gradation is used for G, and horizontal gradation is used for B. That is, when decreasing the B gain by changing blue to a color other than blue, the B gain is decreased after the change to a screen in a display mode in different patterns corresponding to classification by color in the screen before changing blue to the color other than blue.

Note that display of the R, G, and B histograms has been explained in this embodiment. However, the present invention is applicable to display which is difficult to visually perceive when dark place display is performed since the number of B components is large. For example, it is possible to deal with this problem by performing the same processing as that for the R, G, and B histograms when OSD is displayed using the B components when performing white balance correction.

Figure 7A:
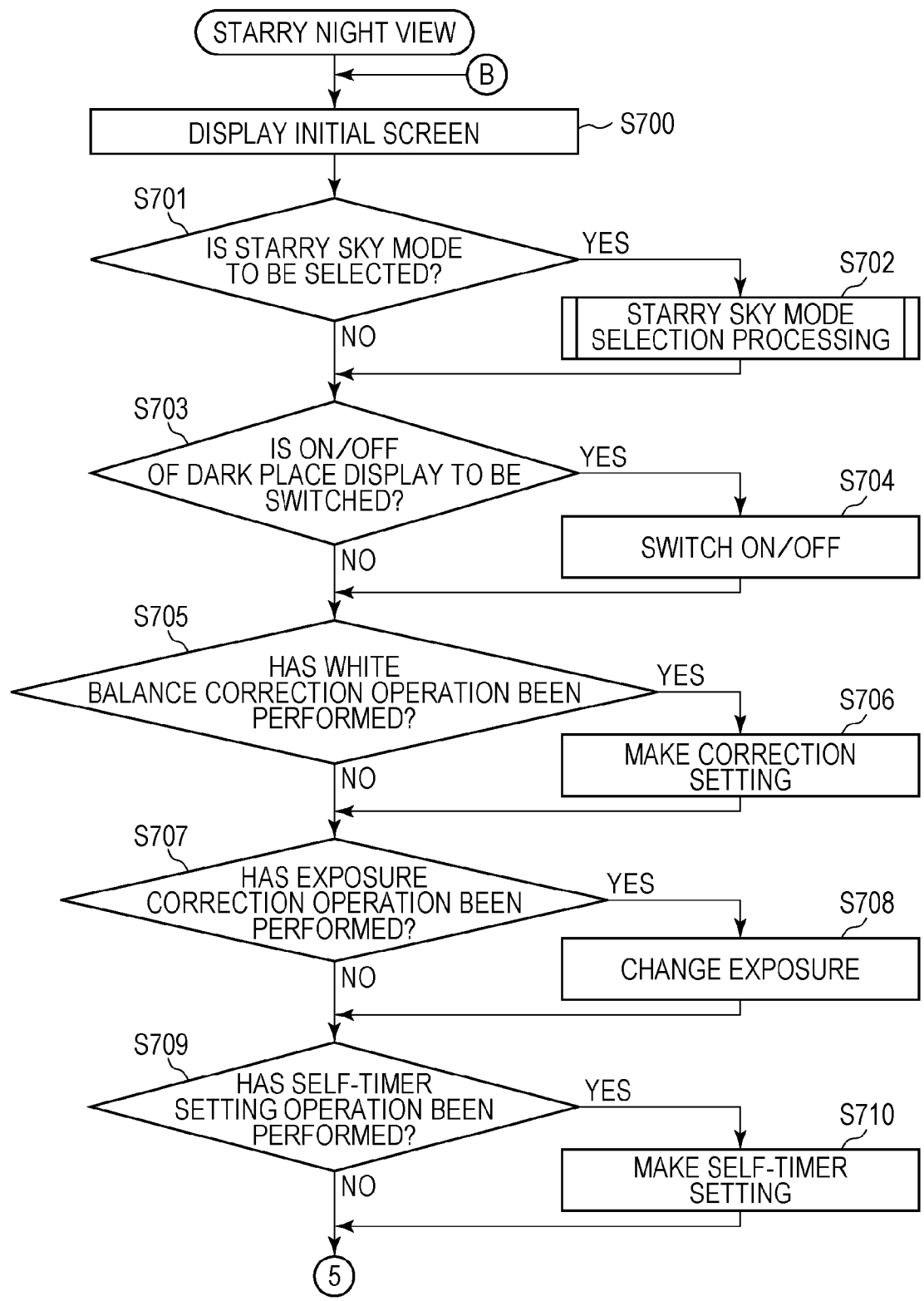
FIGS. 7A to 7C are flowcharts illustrating shooting processing in a Star Nightscape mode according to the embodiment.

<Star Nightscape Mode> Processing in the Star Nightscape mode in step S304 of FIG. 3 will be described with reference to FIGS. 7A to 7C.

In step S700, the system control unit 201 displays the initial screen of the Star Nightscape mode on the display unit 101. The display contents of the initial screen are the same as those of the initial screen (FIG. 6A) of the above-described starry sky snap mode except that no guidance display 601 is displayed.

Processes in steps S701 to S714 and S726 to S732 are the same as those in steps S503 to S516 and S535 to S541 of FIGS. 5A to 5D, respectively, and a description thereof will be omitted. Note that since it is necessary to perform flash shooting for shooting a person in the starry sky snap mode, it is determined in step S501 whether the electronic flash 113 is exposed. However, since it is not necessary to perform flash shooting in the Star Nightscape mode, there is no determination processing corresponding to the process in step S501 in the Star Nightscape mode.

In step S715, the system control unit 201 counts the setting seconds of the self-timer according to a self-timer setting determined in step S714. Note that in the Star Nightscape mode, the light emitting unit 112 is turned off during counting (count-down operation) of the self-timer, and no self-timer sound is pronounced. Unlike the starry sky snap mode, the Star Nightscape mode does not assume shooting of a person. It is, therefore, unnecessary to provide a notification to the object side by turning on the light emitting unit 112 during the count-down operation of the self-timer. Turning on the light emitting unit 112 may result in disadvantages with respect to a shooting target and shooting situation assumed in the Star Nightscape mode. For example, assume that when shooting the starry sky or nightscape (night view) in a dark place, there is another person who is viewing the starry sky or nightscape (night view) around the photographer. In this case, if the light emitting unit 112 is turned on, this may interfere with viewing of the starry sky or nightscape by the other person, resulting in annoyance. The Star Nightscape mode is also suitable to shoot fireflies. If the light emitting unit 112 is turned on at this time, this adversely influences fireflies. Also, if there is another person who is viewing fireflies around the photographer, turning on the light emitting unit 112 may interfere with viewing of fireflies by the other person, resulting in annoyance.

Similarly, it is not necessary to provide a notification of the self-timer sound. Rather, there may be disadvantages. A dark place scene such as viewing of the starry sky, a nightscape, and fireflies is often in a quiet environment, and thus the self-timer sound may interfere with people around the photographer. Furthermore, when natural living beings such as fireflies are objects, a sound may make them escape, thereby avoiding shooting. In the skyrocket shooting mode and nightscape shooting mode, there may be the same disadvantages. Therefore, no light emitting unit 112 is turned on or no self-timer sound is pronounced. Note that only light emission (turn-on/flickering) of the light emitting unit 112 may be prohibited, and only the self-timer sound may be pronounced.

Note that even in the Star Nightscape mode, it can be assumed that a person is shot when the face of a person can be detected from a through image being shot and, therefore, the light emitting unit 112 may be caused to flicker in step S715, thereby providing a notification of the operation status of the self-timer to the object side. Furthermore, since it can be assumed that a person is shot by assuming that the photographer enters the shooting range as an object when the setting seconds of the self-timer are 10 sec or longer, the light emitting unit 112 may be caused to flicker in step S715, thereby providing a notification of the operation status of the self-timer to the object side. If the setting seconds of the self-timer are less than 10 sec, for example, 2 sec, the self-timer is assumed to be used not to shoot a person but to eliminate the influence of camera shake by pressing the shutter.

In step S716, the system control unit 201 determines whether the setting seconds of the self-timer have elapsed. If the setting seconds have elapsed, the process advances to step S717; otherwise, the process returns to step S715.

In step S717, the system control unit 201 causes the pronunciation unit 217 to pronounce the shutter start sound in synchronism with the timing at which the shutter 204 opens. This enables the photographer to confirm the shooting start timing. Note that if the silence setting has been made in advance in the menu screen or the like, the shutter sound is not pronounced.

In step S718, the system control unit 201 performs shooting with long exposure.

In step S719, the system control unit 201 causes the pronunciation unit 217 to pronounce the shutter end sound in synchronism with the end of exposure. This enables the photographer to confirm completion of exposure. If the silence setting has been made in advance in the menu screen or the like, the shutter sound is not pronounced. Also, the system control unit 201 does not turn on the light emitting unit 112, thereby providing no notification of completion of shooting. As described above, it is unnecessary to provide a notification to the object side, and turning on the light emitting unit 112 in a dark place may result in disadvantages.

In step S720, the system control unit 201 shoots a black image by long-exposure shooting by closing the shutter 204 in order to execute noise processing of long-exposure shooting performed in step S718. The image processing unit 207 generates a noise-reduced image by processing the image obtained in step S718 and that obtained in step S720.

In step S721, the system control unit 201 refers to the current setting status stored in the nonvolatile memory 213 or the system memory 212, and determines whether star enhancement processing is ON. If the star enhancement processing is ON, the process advances to step S722; otherwise, the process advances to step S723.

In step S722, the system control unit 201 causes the image processing unit 207 to detect bright spots such as stars from the noise-reduced image obtained in step S720, and execute enhancement processing of, for example, enlarging the sizes of the bright spots.

In step S723, the system control unit 201 causes the image processing unit 207 to detect bright spots such as stars from the noise-reduced image obtained in step S720, and execute no enhancement processing.

In step S724, the system control unit 201 records the starry sky image generated in step S722 or S723 in the recording medium 109.

In step S725, the system control unit 201 determines whether the starry sky snap mode has been set through the operation units 104. If the starry sky snap mode has been set, the processing shown in FIGS. 5 A to 5D is performed; otherwise, the process advances to step S726.

<Star Trail Mode> Processing in the star trail mode in step S305 of FIG. 3 will be described with reference to FIGS. 8A to 8D.

In the star trail mode, a still image shooting operation is performed a plurality of times at a predetermined interval in response to one shooting instruction. A composite image (multiple-composite image) is generated from shot still images, and recorded. That is, the star trail mode is a mode in which in response to one shooting instruction, interval shooting in which a shooting operation is performed a plurality of times at an interval is performed. For the sake of convenience, a series of processes from the start of shooting to recording of a composite image will be referred to as star trail shooting hereinafter, and each still image shooting operation performed during star trail shooting will be simply referred to as shooting (or still image shooting) hereinafter.

In step S800, the system control unit 201 displays the initial screen (FIG. 9A) of the star rail mode on the display unit 101.

Figure 5A:
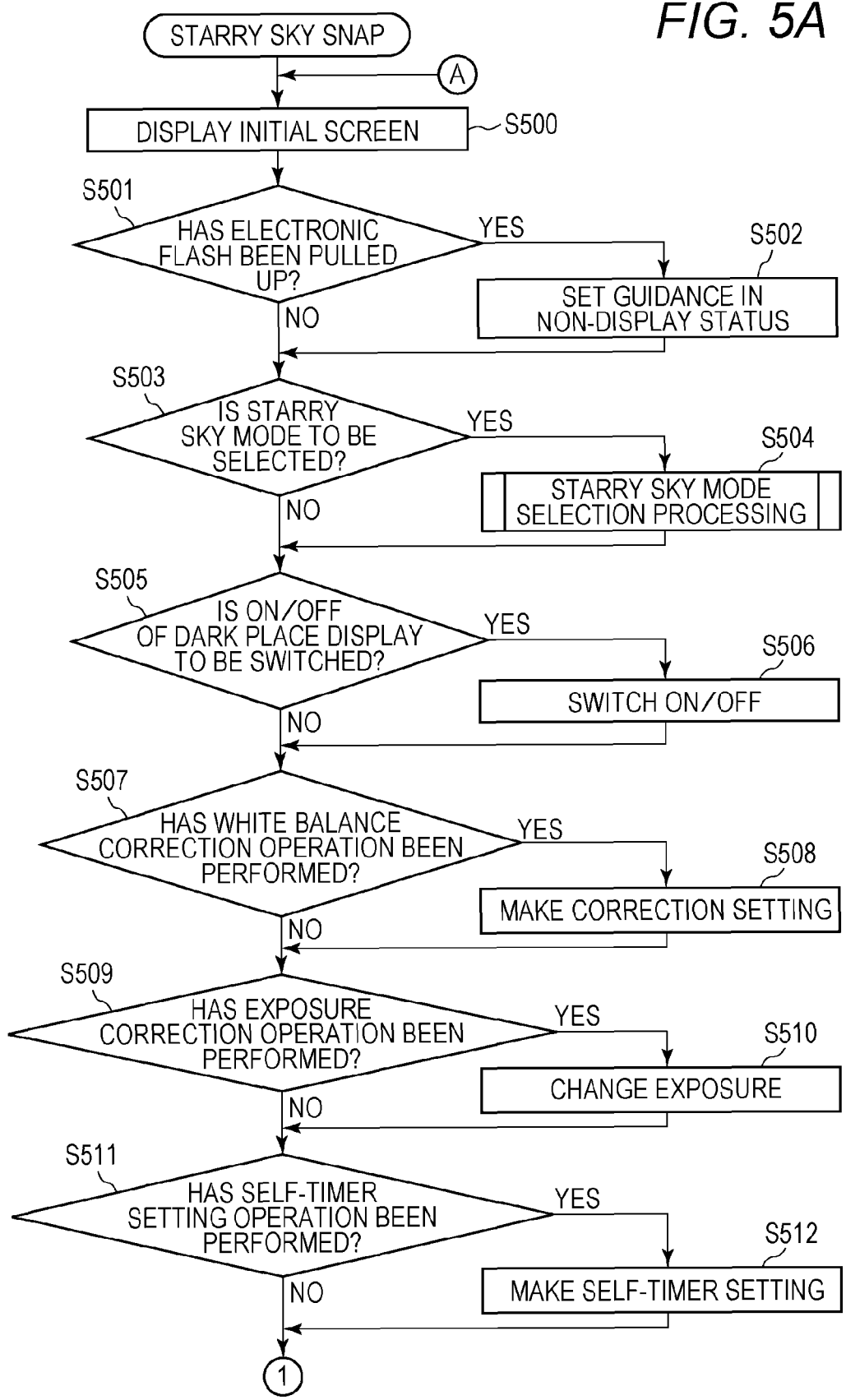
FIGS. 5A to 5D are flowcharts illustrating shooting processing in a starry sky snap mode according to the embodiment.
Figure 5B:
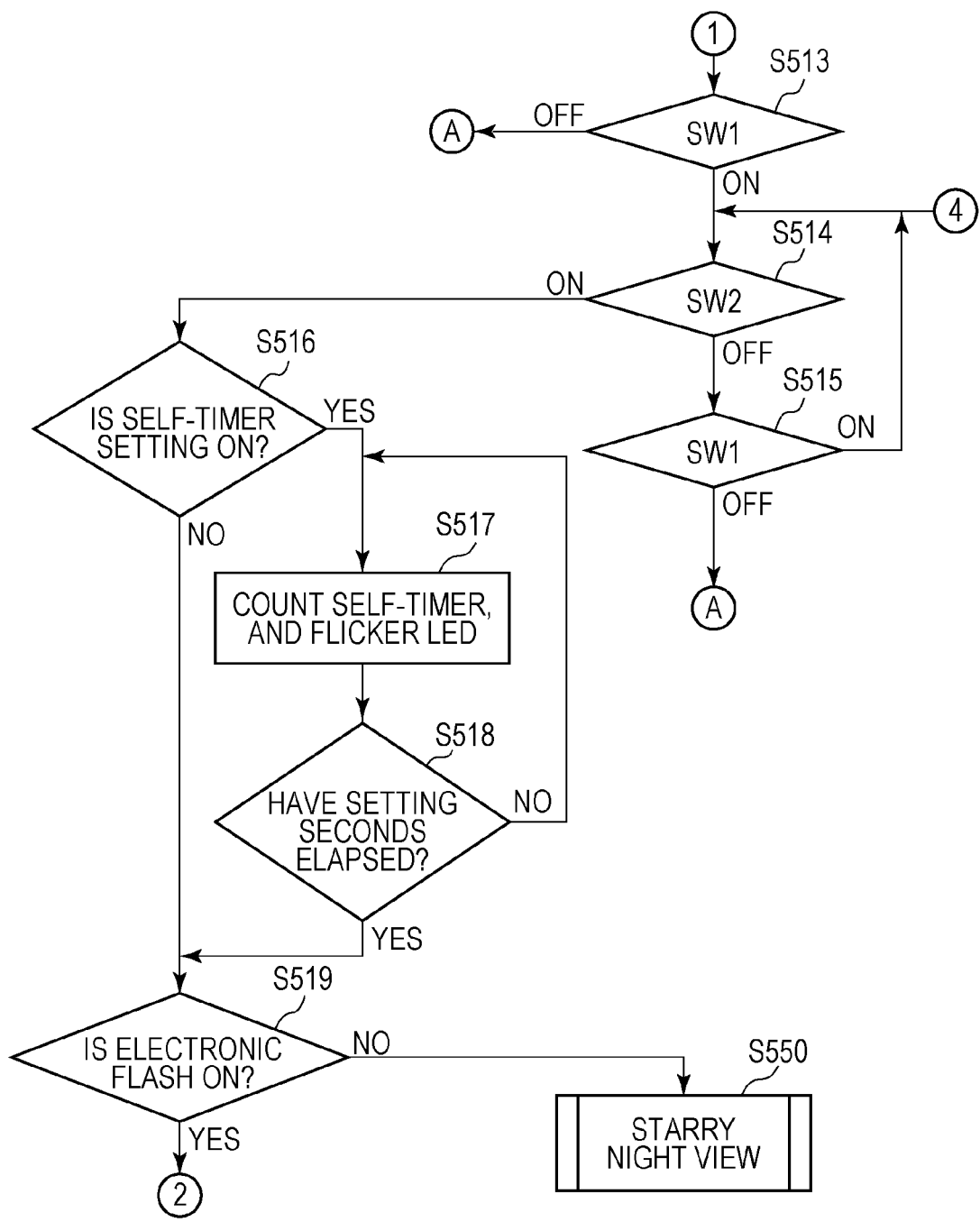
Figure 5C:
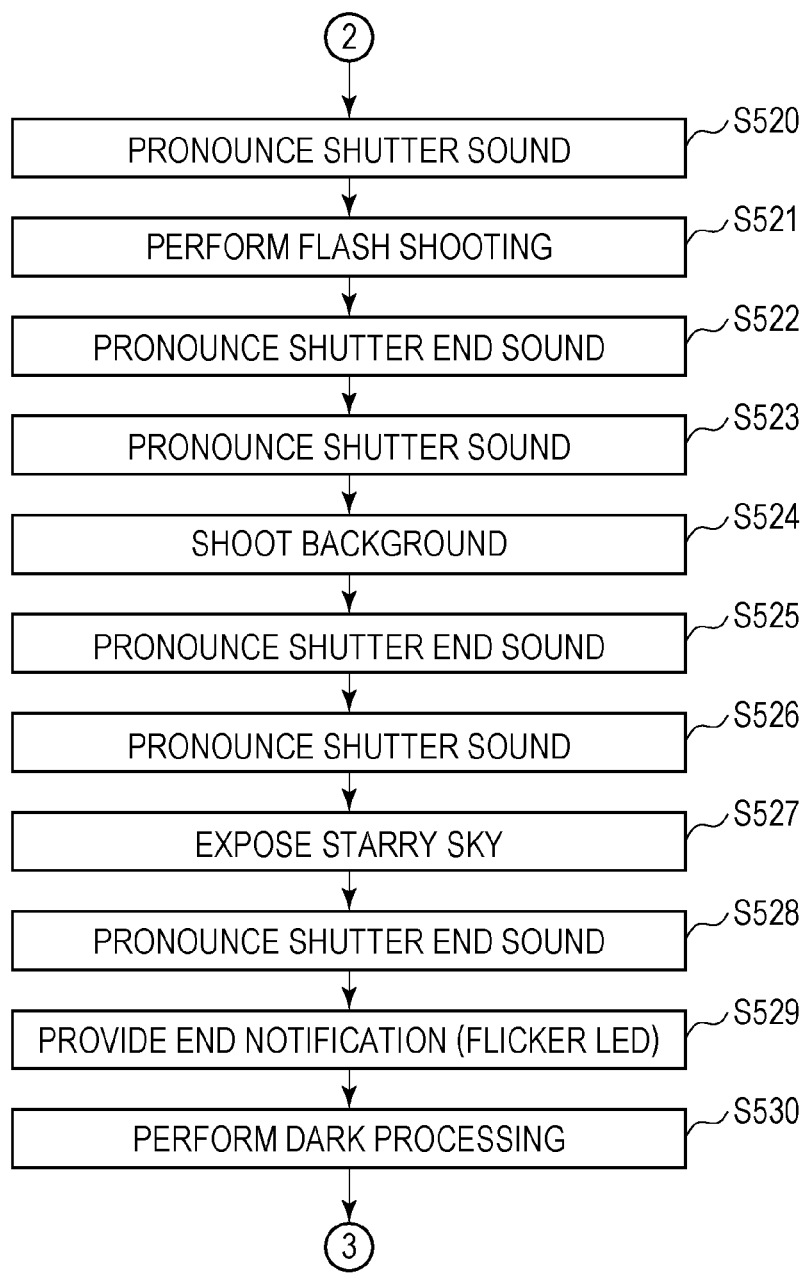

Processes in steps S801 to S810 are the same as those in steps S503 to S512 of FIG. 5A, respectively, and a description thereof will be omitted.

In step S811, the system control unit 201 determines whether the total shooting time has been set using the controller wheel 106 of the operation units 104. The total shooting time is a time during which star trail shooting is continuously performed, and can be set by selecting one of options of 10 min, 30 min, 60 min, and 120 min by the user. In other words, the total shooting time is a time scheduled as a time required for a series of interval shooting operations. If the total shooting time has been set, the process advances to step S812; otherwise, the process advances to step S813.

In step S812, the system control unit 201 holds the total shooting time set in step S811 in the memory 210, and changes the total shooting time displayed on the display unit 101. Note that the total shooting time held in the memory 210 may be recorded in the nonvolatile memory 213 upon power-off.

In step S813, the system control unit 201 determines whether the first shutter switch signal SW1 has been turned on by pressing the shutter-release button 102 halfway. If the first shutter switch signal SW1 has been turned on, the process advances to step S814; otherwise, the process returns to step S800.

In step S814, the system control unit 201 performs AF processing to cause the photographing lens 203 to focus on the object, and performs AE processing to decide the f-number and shutter seconds (exposure time) of the shutter 204.

In step S815, the system control unit 201 adds a predetermined time required for one shooting process to the shutter seconds decided in step S814, thereby calculating a shooting interval in star trail shooting.

In step S816, the system control unit 201 divides the total shooting time set in step S812 by the shooting interval calculated in step S815, thereby calculating the total number of images to be shot in star trail shooting.

Figure 7B:
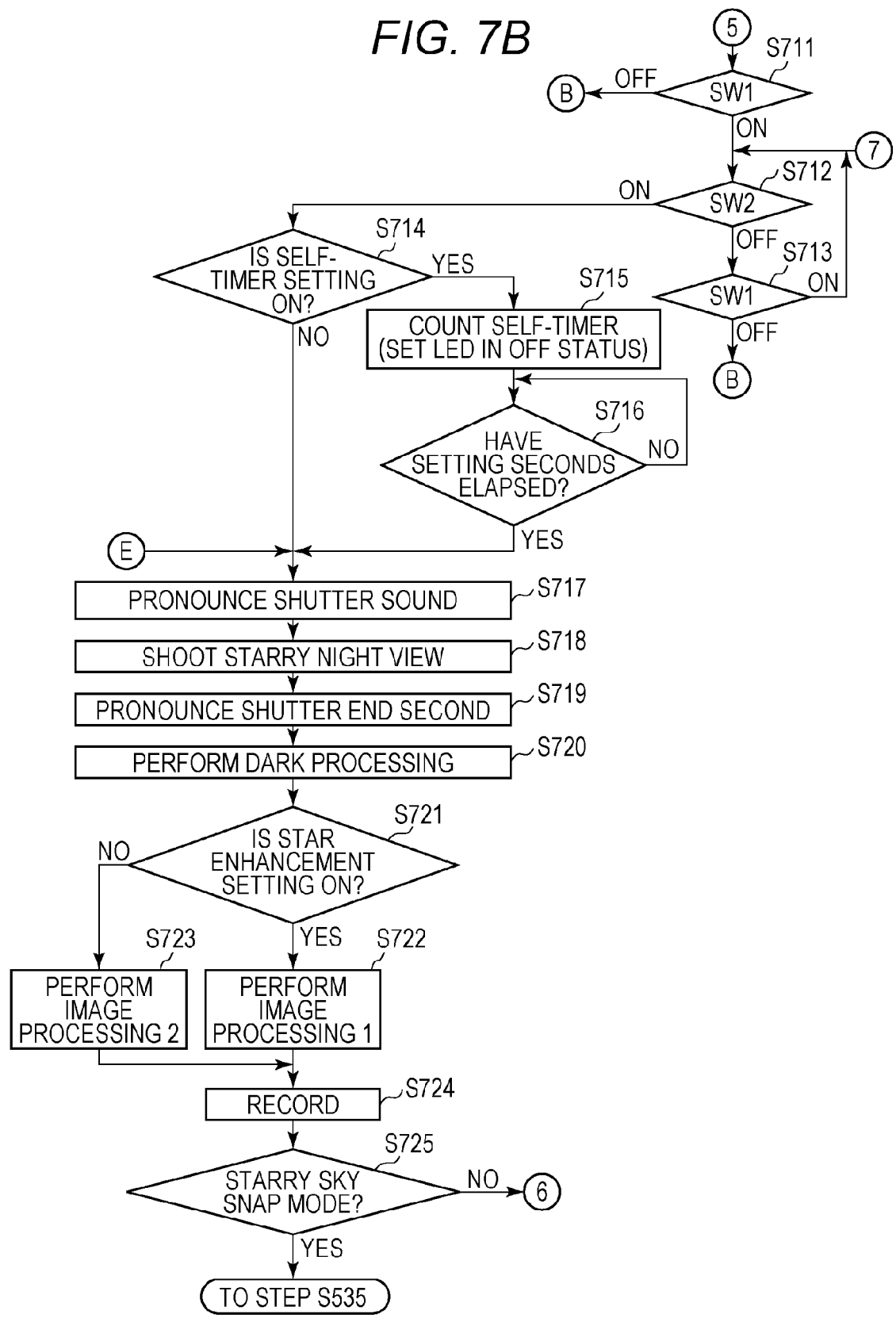
Figure 7C:
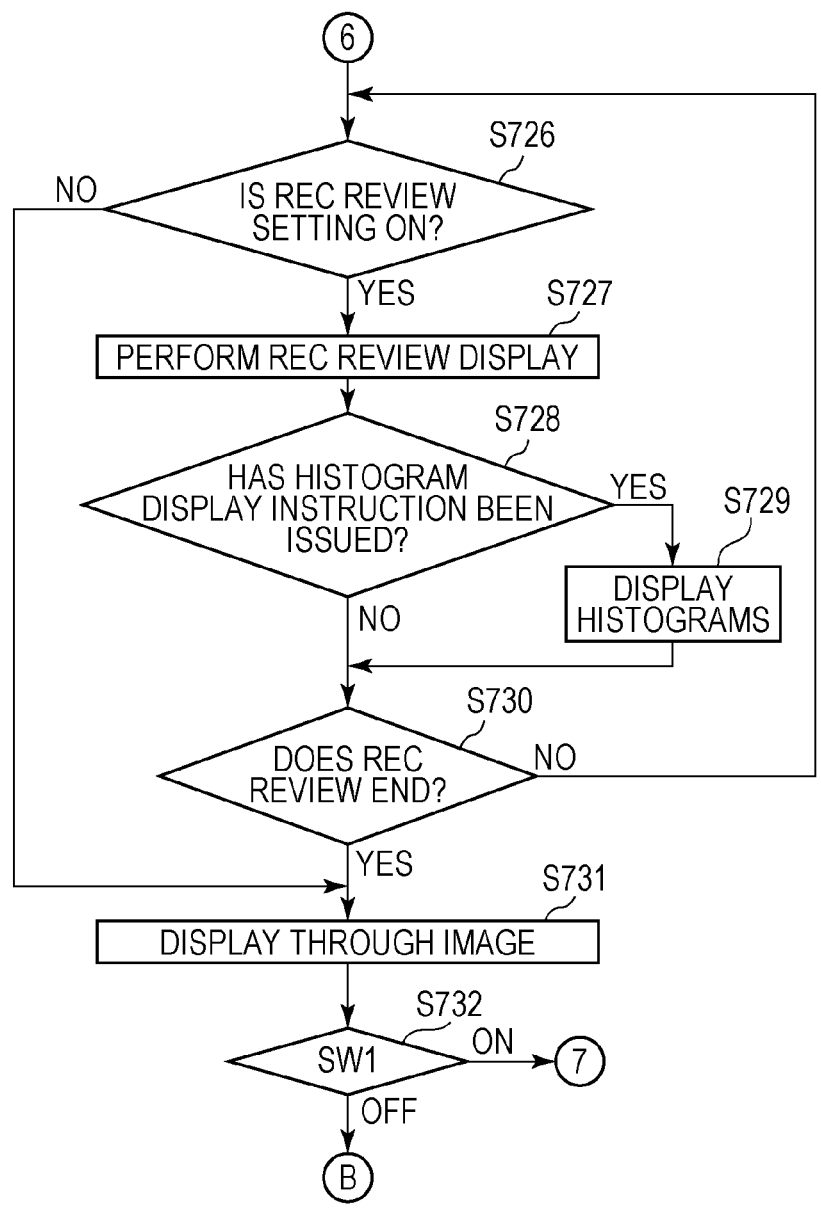
Figure 8A:
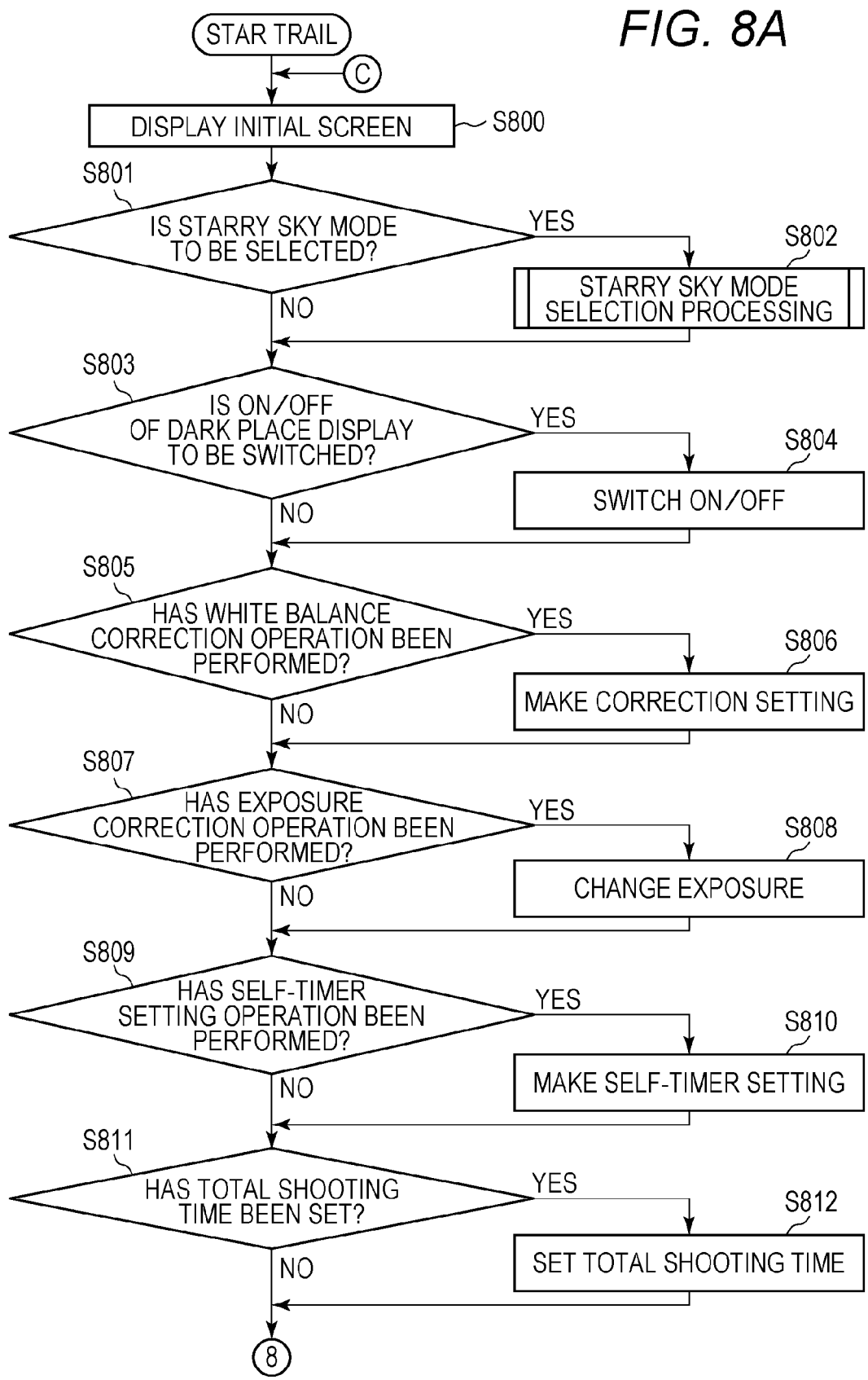
FIGS. 8A to 8D are flowcharts illustrating shooting processing in a star trail mode according to the embodiment.
Figure 8B:
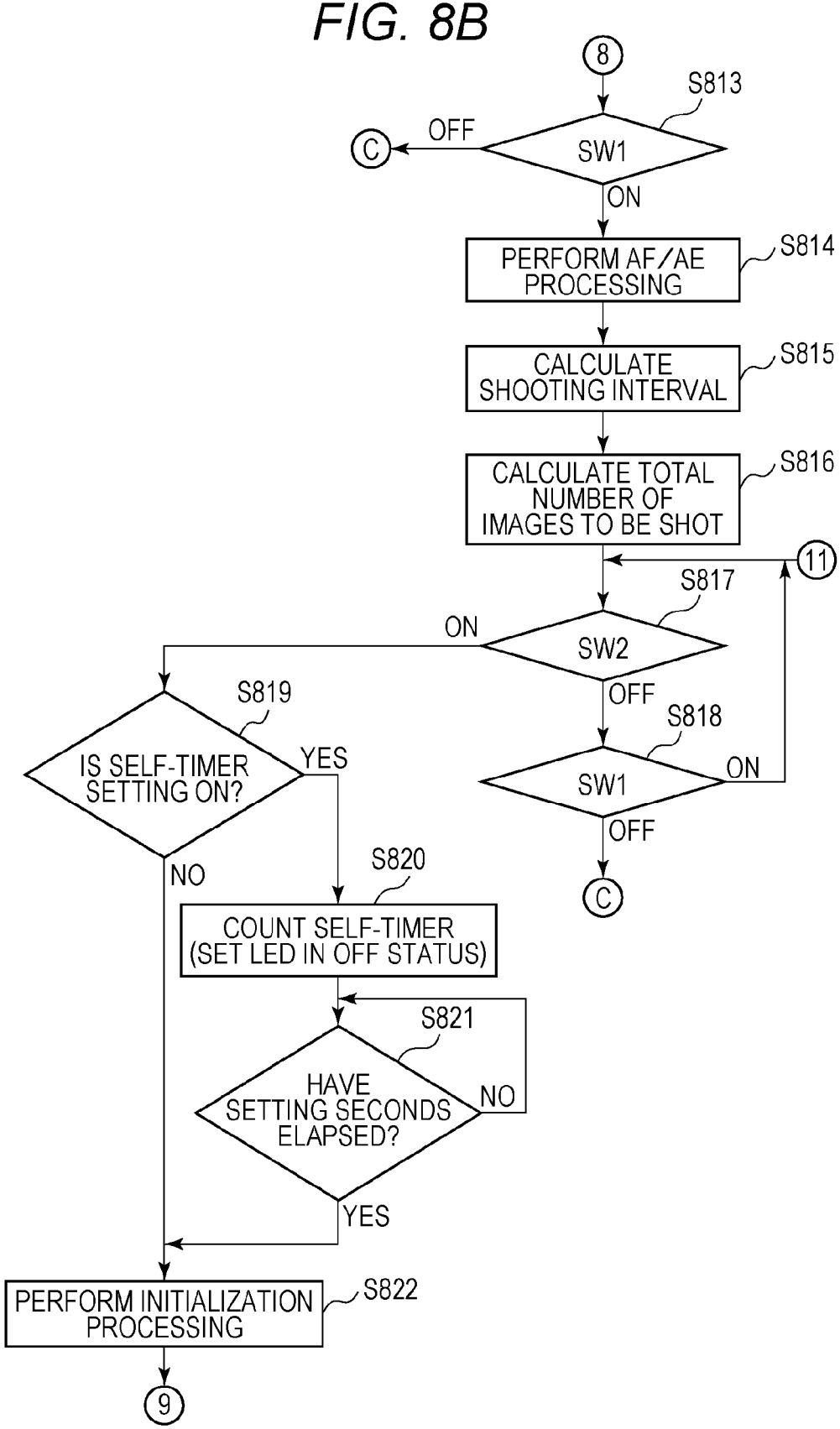
Figure 8C:
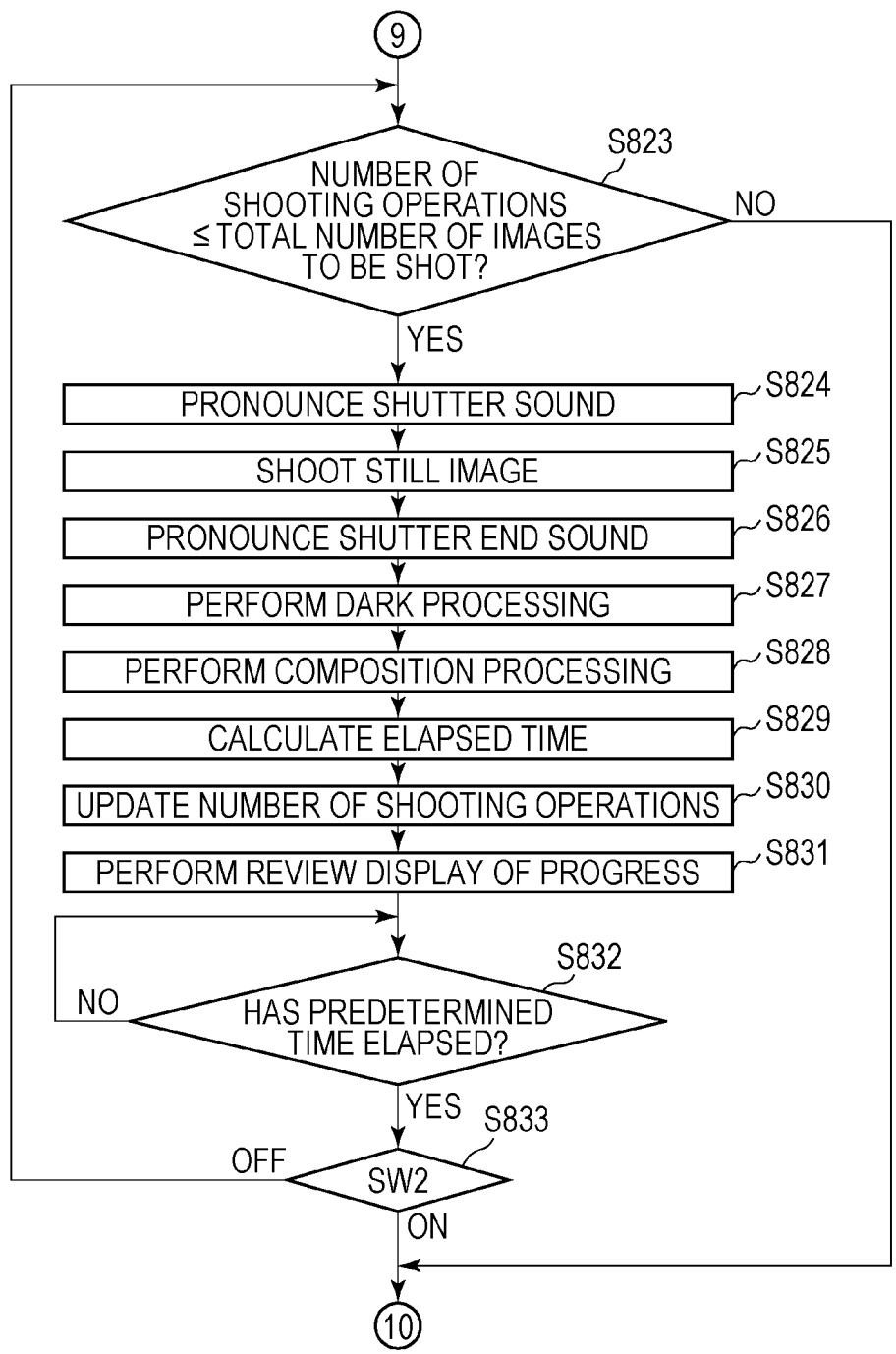
Figure 8D:
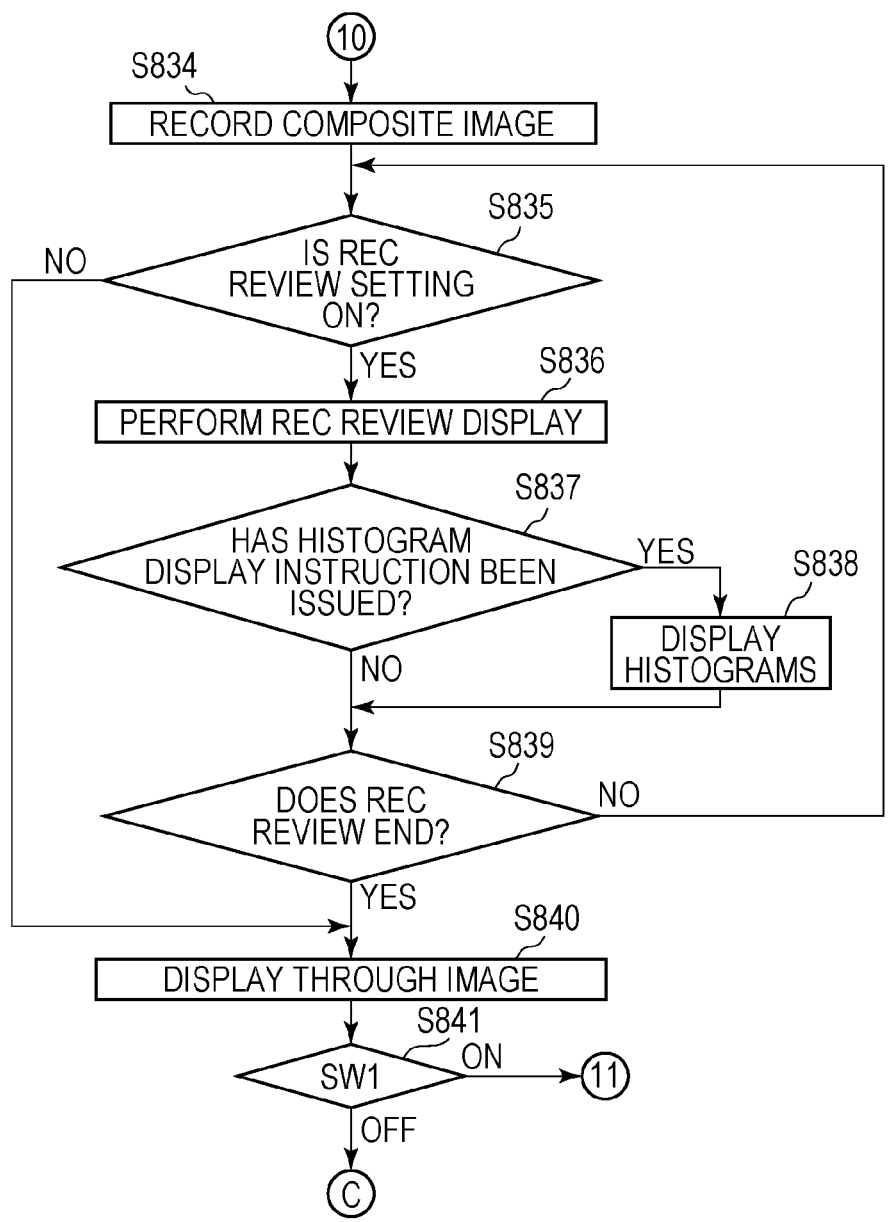

Processes in steps S817 to S821 are the same as those in steps S712 to S716 of FIG. 7B, respectively, and a description thereof will be omitted.

In step S822, the system control unit 201 performs noise reduction processing for long-exposure shooting, and initialization processing of, for example, setting an initial value in a counter of the number of shooting operations of still image shooting (to be described later).

In step S823, the system control unit 201 compares the current number of shooting operations with the total number of images calculated in step S816. If the number of shooting operations is equal to or smaller than the total number of images, the process advances to step S824; otherwise, the process advances to step S834.

In step S824, the system control unit 201 causes the pronunciation unit 217 to pronounce the shutter start sound in synchronism with the timing at which the shutter 204 opens. This enables the photographer to confirm the shooting start timing.

In step S825, the system control unit 201 performs exposure under the shooting conditions decided in step S814, thereby shooting an object such as the starry sky or nightscape.

In step S826, the system control unit 201 causes the pronunciation unit 217 to pronounce the shutter end sound in synchronism with the end of exposure. This enables the photographer to confirm completion of exposure. Note that the system control unit 201 does not turn on the light emitting unit 112, thereby providing no notification of completion of shooting. As described above, it is unnecessary to provide a notification to the object side, and turning on the light emitting unit 112 in a dark place may result in disadvantages.

In step S827, the system control unit 201 shoots a black image by long-exposure shooting by closing the shutter 204 in order to execute noise processing of long-exposure shooting performed in step S815. The image processing unit 207 generates a noise-reduced image by processing an image obtained in step S825 and that obtained in step S827.

In step S828, the system control unit 201 composites the image generated in step S827 and the composite image generated and held in the memory 210 in step S828, thereby generating a new composite image, and holding it in the memory 210. This composition processing is multiple composition in which the image generated in step S827 and the composite image held in the memory 210 are superimposed (which is not panorama composition).

In step S829, the system control unit 201 calculates an elapsed time after the start of shooting by multiplying the current number of shooting operations by the shooting interval calculated in step S815.

In step S830, the system control unit 201 adds 1 to the current number of shooting operations.

Figure 9A:
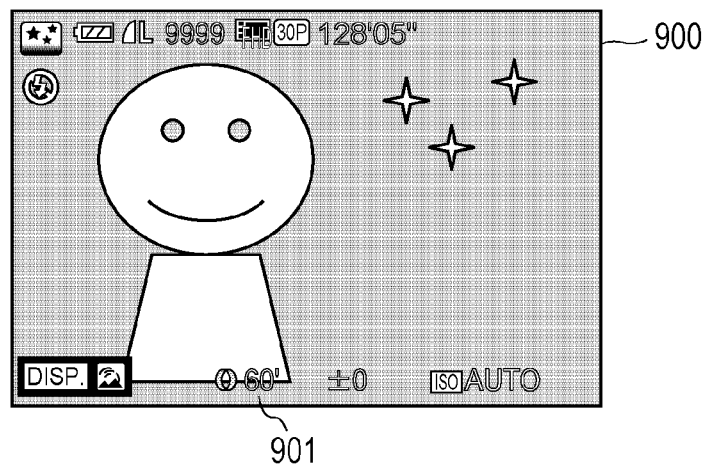
FIGS. 9A to 9C are views each showing a display example of a screen in the star trail mode according to the embodiment.
Figure 9B:
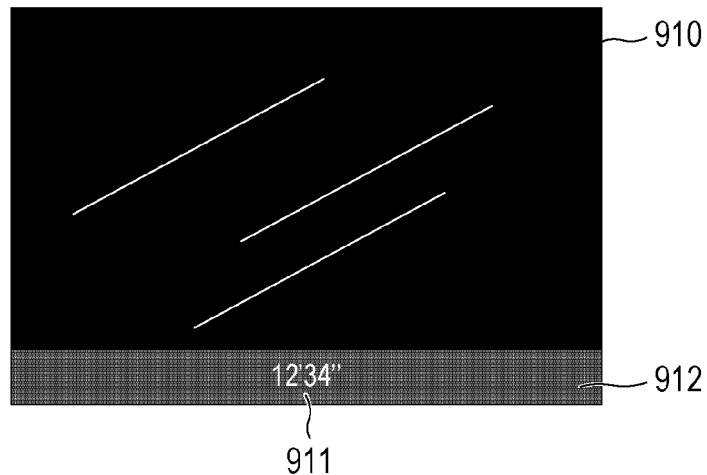

In step S831, the system control unit 201 displays the composite image generated in step S828 and the elapsed time calculated in step S829 on the display unit 101 (FIG. 9B).

In step S832, the system control unit 201 determines whether the time taken for shooting processing except for exposure of still image shooting in step S825 exceeds a predetermined time in one shooting process. The predetermined time is that used to calculate the shooting interval in step S815. If the predetermined time has elapsed, the process advances to step S833; otherwise, the process returns to step S832 to stand by until the predetermined time elapses.

In step S833, the system control unit 201 determines whether the second shutter switch signal SW2 has been turned on by fully pressing the shutter-release button 102. If the second shutter switch signal SW2 is OFF, the process advances to step S823 to perform the next still image shooting processing; otherwise, the process advances to step S834. If the second shutter switch signal SW2 has been turned on, the process advances to step S834 to perform end processing of star trail shooting. That is, it is possible to terminate star trail shooting midway by fully pressing the shutter-release button 102.

In step S834, the system control unit 201 records the composite image generated and held in the memory 210 in step S828 in the recording medium 109 as a still image file.

Figure 5D:
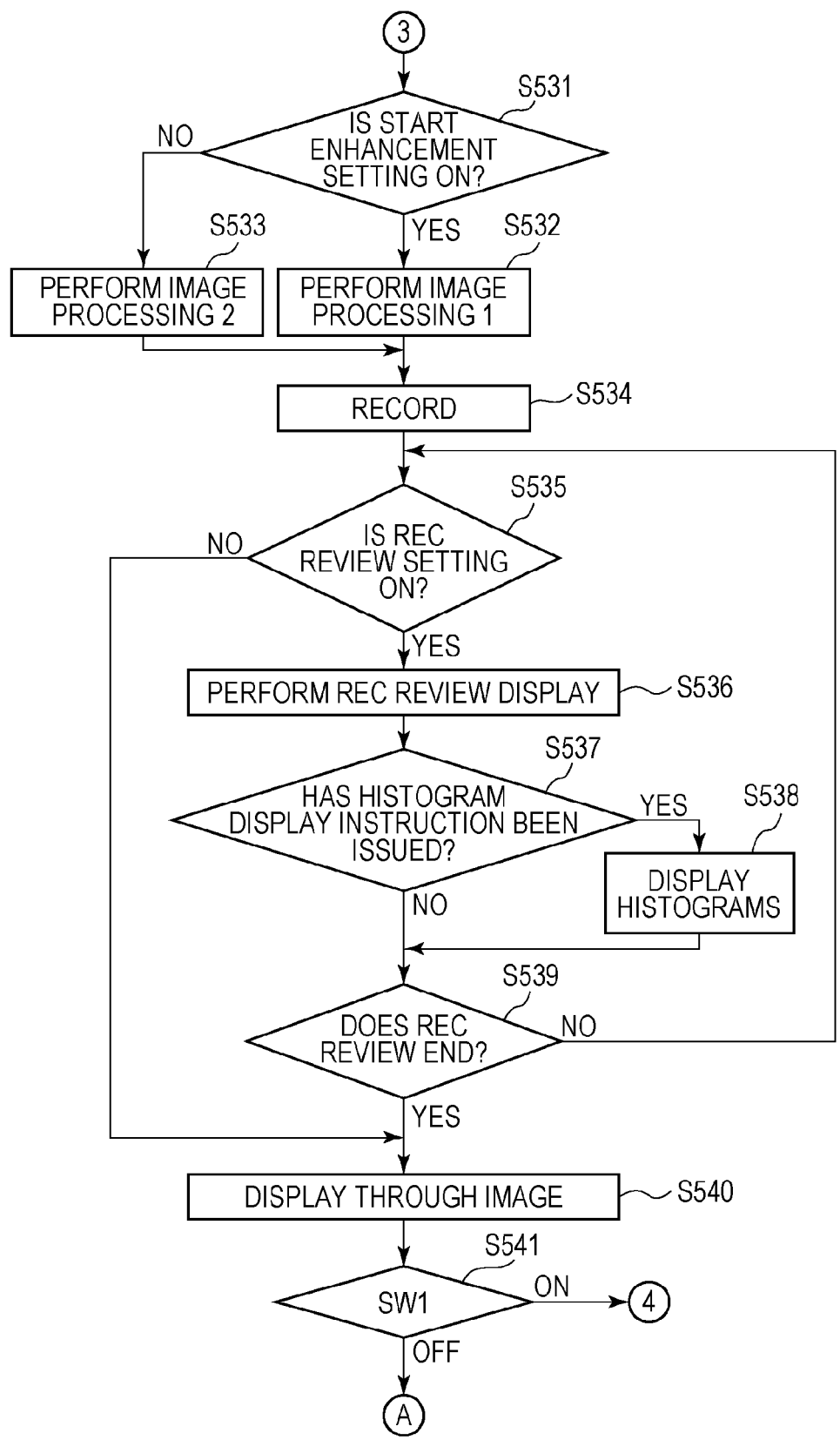

Processes in steps S835 to S841 are the same as those in steps S535 to S541 of FIG. 5D, respectively, and a description thereof will be omitted.

<Star Trail Mode Screen> A screen displayed on the display unit 101 in the star trail mode according to this embodiment will be described with reference to FIGS. 9A to 9C.

FIG. 9A exemplifies a shooting standby screen in the star trail mode. On the display unit 101, the current total shooting time and an icon 901 operable by the controller wheel 106 or the like to change the total shooting time are superimposed and displayed on a through image 900 as OSD. In the example shown in FIG. 9A, the total shooting time has been set to 60 min.

FIG. 9B exemplifies a display screen when reviewing the progress in the star trail mode. On the display unit 101, an elapsed time 911 in a translucent elapsed time display area 912 is superimposed and displayed, as OSD, on a composite image 910 generated until now.

Figure 9C:
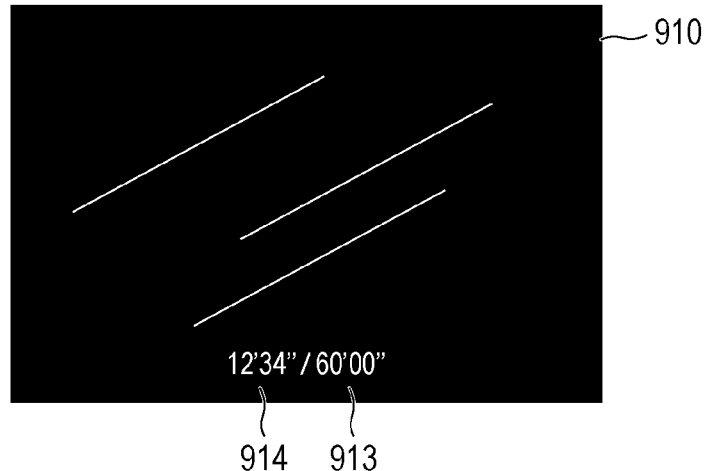
Figure 10A:
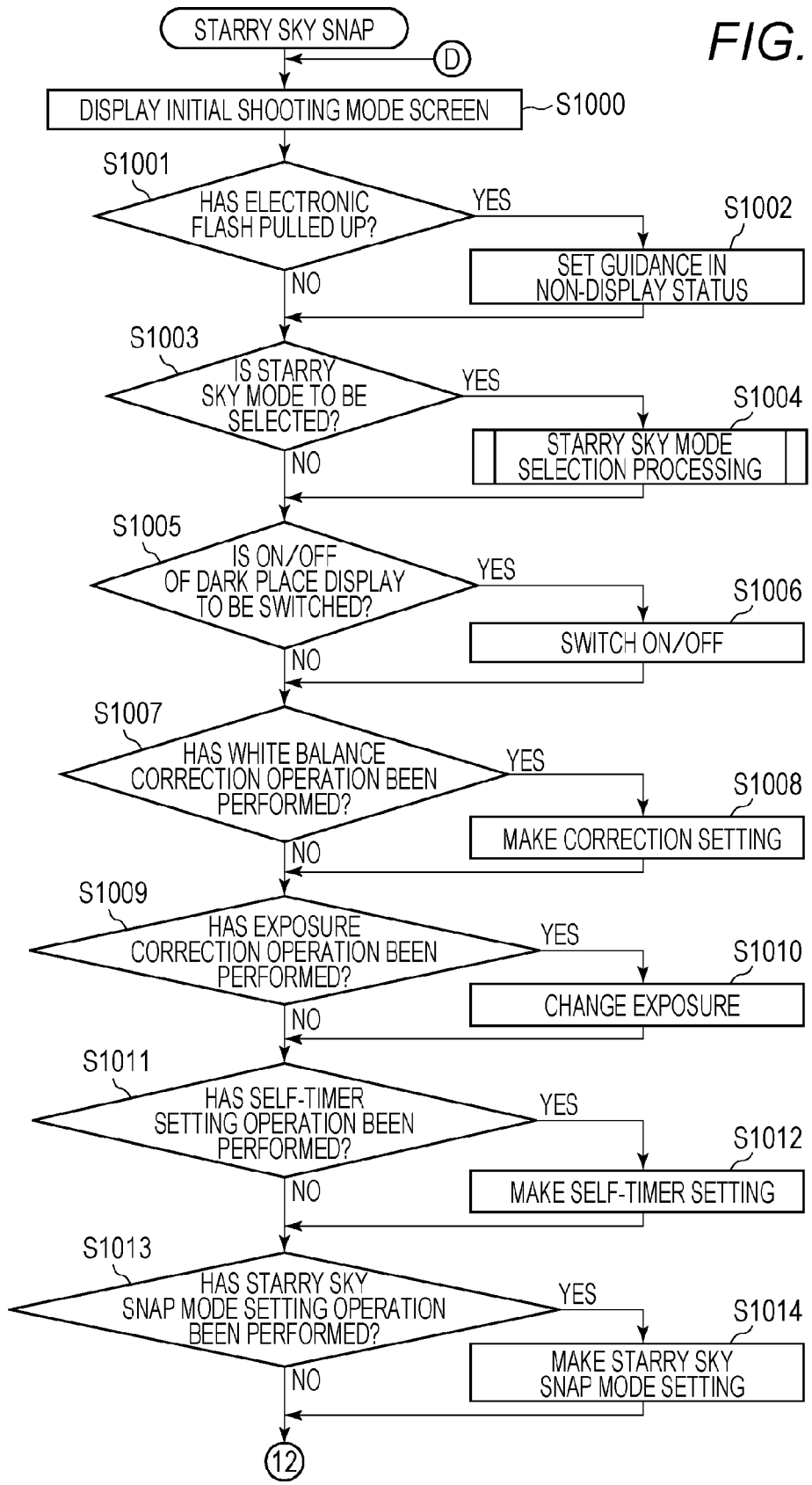
FIGS. 10A to 10D are flow charts illustrating shooting processing in a second starry sky snap mode according to the embodiment.
Figure 10B:
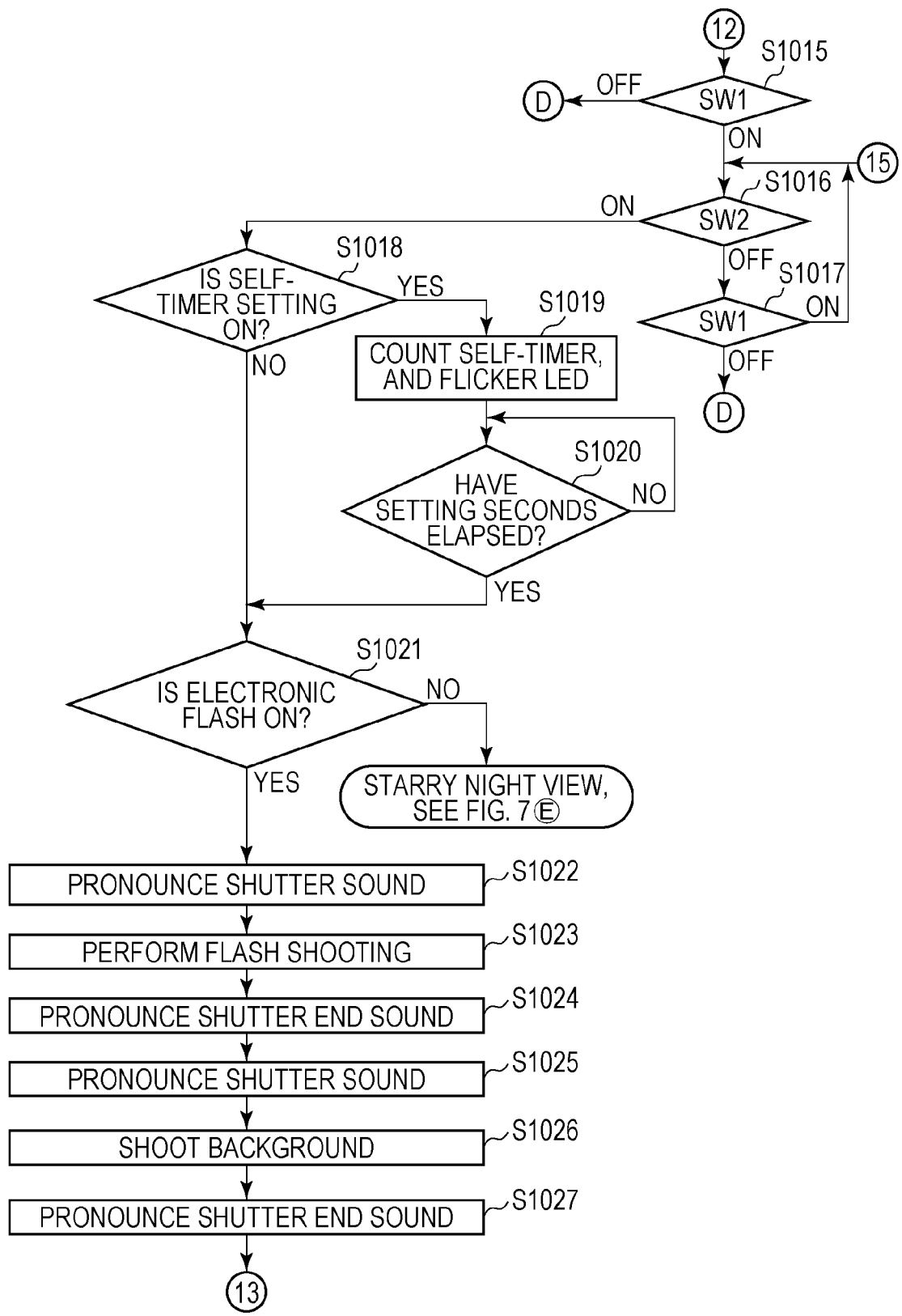
Figure 10C:
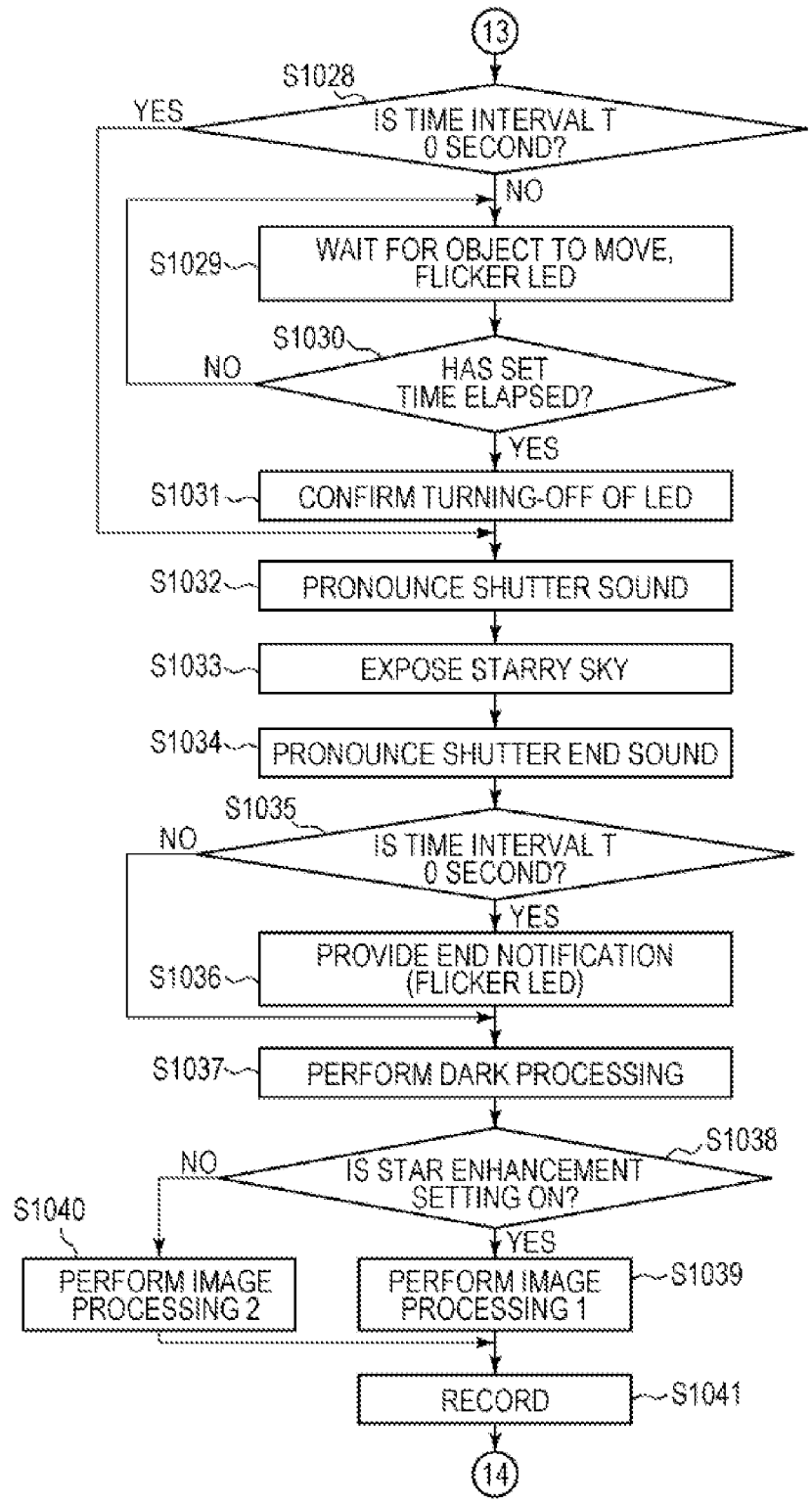
Figure 10D:
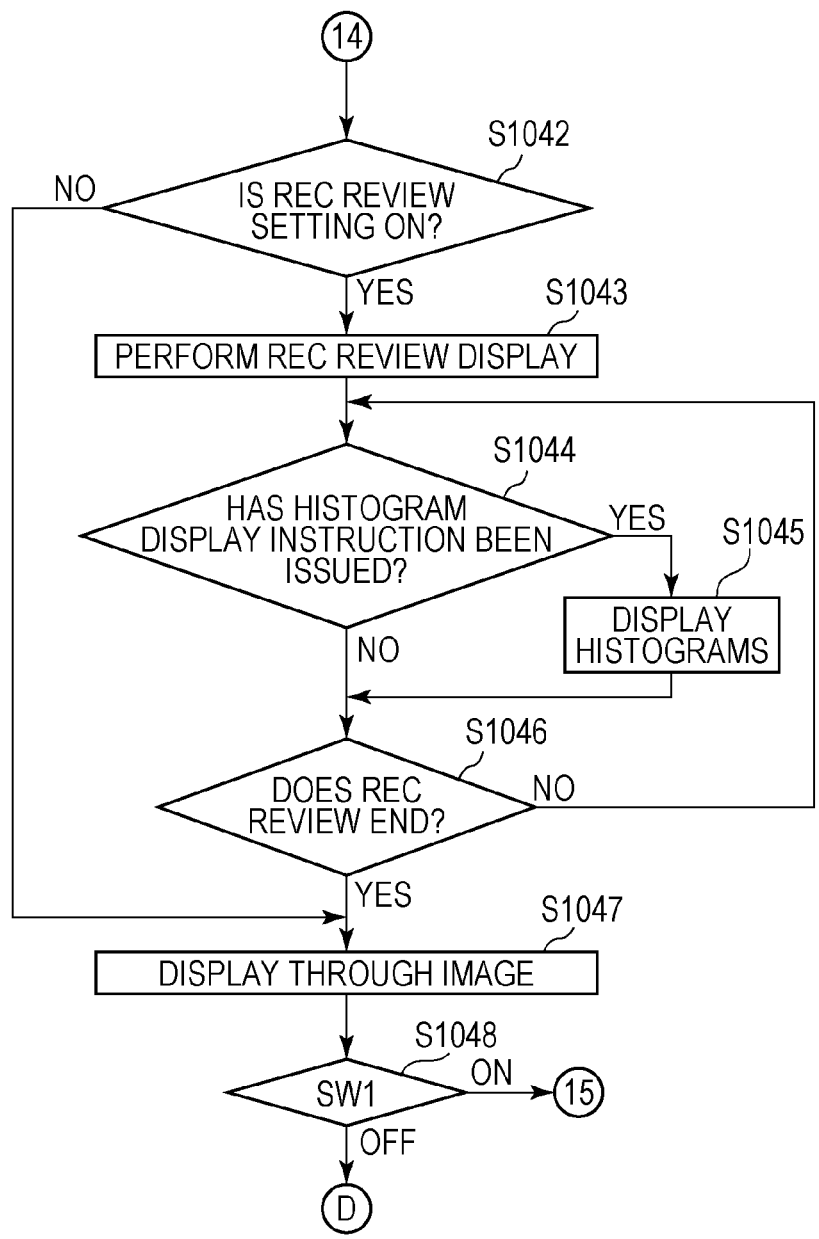

Note that the progress review display may be a display shown in FIG. 9C. That is, on the display unit 101, an elapsed time 914 and a total shooting time 913 are superimposed and displayed on the composite image 910 as OSD. Although both the elapsed time and the total shooting time are displayed, one of them may be displayed. The elapsed time 914 is displayed by outline characters, and no elapsed time display area is displayed.

The display modes exemplified in FIGS. 9B and 9C may be appropriately combined. The elapsed time 911 after the start of shooting is updated and displayed every time a still image shooting operation is performed, and is not updated during (in the middle of) the interval between still image shooting operations. This processing enables the user to know not only the elapsed time but also the shooting interval based on the difference between the updated elapsed times. For example, assume that 12'34" is displayed as the elapsed time 911 at the time of acquiring the Nth still image, 12'34" remains displayed until the (N+1)th still image shooting operation, and then the elapsed time 911 is updated to 12'40" when the (N+1)th still image shooting operation is performed. In this case, the user can know that the shooting interval is 6 sec. That is, the total of the exposure time, dark processing time, and other processing time of one shooting operation is about 6 sec. This makes it possible to indicate the elapsed time and shooting interval by one piece of time information, thereby saving a display space, and preventing the composite image 910 displayed on the display unit 101 from becoming difficult to see. Furthermore, by performing review display of the composite image 910 generated at this time together with the elapsed time 911, the user can associate the elapsed time with the length of a trail, and estimate the remaining time required to shoot a trail of a desired length.

Note that in the above-described embodiment, a case in which one composite image is finally recorded in step S834 has been explained. However, in addition to the one composite image, the still images (that is, the material images of the composite image) recorded in step S825 may also be individually recorded as still image files in the recording medium 109. Furthermore, the composite image generated midway in step S828 may be individually recorded. Individually recording the images as the materials of the composite image makes it possible to perform modification using an image processing application or the like of a PC later when the composite image shot in the star trail mode is recognized as a failed image.

The user may arbitrarily set the shooting time. When the user can set the shooting time, freer star trail shooting is possible.

If there is a limit to a selectable total shooting time due to the remaining capacity of the recording medium 109, an upper limit may be set for the value selectable in step S811 or S812 or a notification may be provided to the user by changing the color of the icon 901.

Instead of displaying the elapsed time (count-up), the remaining time (count-down) may be displayed. In this case, the user can know not only the remaining time from one piece of time information but also the elapsed time based on the difference from the total shooting time set by himself/herself and the shooting interval based on the difference from the updated remaining time, thereby implementing space-saving information display.

Instead of time information, the number of recordable images, the remaining time, or the remaining capacity of the recording medium 109 may be displayed.

The user may freely set the display mode of these pieces of display information through the menu screen or the like.

Furthermore, when the shooting interval is short, even if display of the elapsed time is updated for each shooting operation, it is difficult for the user to grasp the shooting interval by instantaneously calculating the time difference with respect to the last update operation. When the shooting interval is short (shorter than a predetermined time), therefore, the elapsed time need not be displayed. Alternatively, although the elapsed time is displayed, the elapsed time may be counted up according to the lapse of time irrespective of the interval period (for example, once per sec), instead of updating display of the elapsed time for each shooting operation, when the shooting interval is short (shorter than the predetermined time). If the shooting interval is equal to or longer than the predetermined time, an update operation is performed for each shooting operation, as described above.

The above-described method of displaying the elapsed time (an update operation is performed for each shooting operation of interval shooting) may be performed in the starry sky interval moving image mode in which moving image interval shooting is performed.

Note that a single item of hardware may control the system control unit 201, or the entire apparatus may be controlled by a plurality of items of hardware sharing processing.

[Second Embodiment]

Second Embodiment of the present invention will be described next. Assume that Second Embodiment is the same as First Embodiment with respect to the hardware configuration and the flow charts illustrated in the diagrams other than FIGS. 5A to 5D. The shooting procedures in the starry sky snap mode according to First Embodiment are based on the assumption that a person as an object does not move until the person and a starry sky have been shot. On the other hand, Second Embodiment relates to shooting procedures carried out based on the assumption that a person as an object may move out of a shooting range between after shooting of the person and before start of shooting of a starry sky.

With reference to FIGS. 10A to 10D, processes in the starry sky snap mode according to Second Embodiment will be described. The processes are equal to the details of the process of step S303 in FIG. 3 mentioned above and replaces the processes in FIGS. 5A to 5D in First Embodiment. Further, the processes are carried out in such a manner that a program recorded in the nonvolatile memory 213 is read to the system memory 212 and is executed by the system control unit 201.

Figure 11A:
FIGS. 11A to 11C are display examples of a screen in the second starry sky snap mode according to the embodiment.

In step S1000, the system control unit 201 displays an initial screen in the starry sky snap mode on the display unit 101. FIG. 11A illustrates a display example on the initial screen in the starry sky snap mode. This is a display notified to a user before the user selects the starry sky snap mode (prior to start of shooting a person). OSD (information such as shooting conditions) is superimposed and displayed on a through image 1100 on the display unit 101. In OSD, guidance display 1101 for recommending an object to move out of the screen is displayed (notified) after the electronic flash is turned on and the notification is started. In the example of FIG. 11A, a message is displayed indicating that "Please move out of screen during flickering of light after electronic flash emission. Starry sky is going to be shot and synthesized".

Processes in steps S1001 to S1012 are the same as those in steps S501 to S512 in FIG. 5.

In step S1013, the system control unit 201 determines whether the setting operation for the starry sky snap mode has been performed by the operation units 104. If the starry sky snap mode setting operation has been performed, the process advances to step S1014 and the starry sky snap mode is set according to the setting operation. If the starry sky snap mode setting operation has not been performed, the process advances to step S1015.

In step S1014, the system control unit 201 allows a starry sky snap setting menu to be displayed on the display unit 101.

Figure 11B:
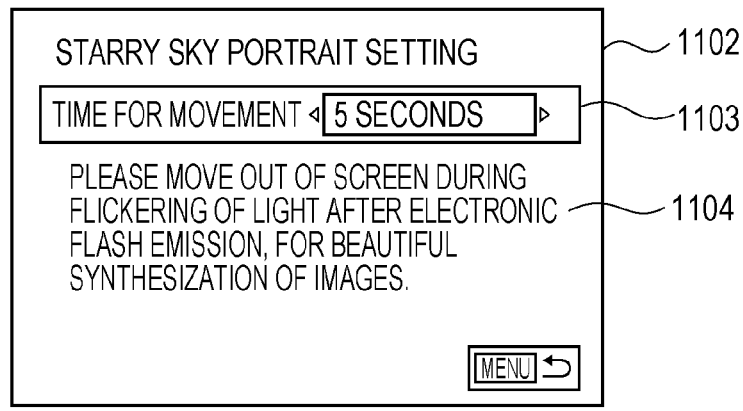

FIG. 11B illustrates a display example of a starry sky snap setting menu 1102. The starry sky snap mode setting menu 1102 shows a time interval T setting section 1103 that displays and sets a time (time interval T) for an object to move, and a guidance 1104 for the time interval T.

By operating the operation unit 104, a photographer can set the time interval T for a person as an object to move between shooting of the person and shooting of a starry sky, to be one of options of 0 second, 5 seconds, 10 seconds, and 15 seconds. Note that an initial value has been set to 10 seconds in advance before a user performs setting operations. The time interval T set by a user is held into the system memory 212. A person after being shot can move from the inside to the outside of the shooting range in the time interval between after shooting of the person and before shooting of a starry sky, including the time interval T. Note that the time interval T held in the system memory 212 may be recorded into the nonvolatile memory 213 upon power-off, and the setting may be maintained at the next activation timing.

The time interval T for the starry sky snap includes the settings of:
providing a time for an object to move between after shooting of the object and before shooting of a starry sky mainly used for the purpose of object blurring prevention (time interval T is 5 seconds, 10 seconds, and 15 seconds); and
performing notification after a series of shootings mainly for the purpose of simplification of shooting (time interval T is 0 second).

In a case where an object is exposed to outside light during shooting of a starry sky, the object will cause a residual image and object blurring in a captured image if the object is present in a shooting range and makes a motion in the time of long exposure for shooting the starry sky. To prevent such situation, the time interval T for an object to move after being shot is set to 5 seconds, 10 seconds, and 15 seconds so that an image with no residual image of the object can be obtained. Further, if an object moves out of a shooting range after being shot, the object does not need to wait in the shooting range during long-time exposure without making a motion. Making the time interval T selectable from 5 seconds, 10 seconds, and 15 seconds can provides setting according to the number of objects. When a large number of persons are to be shot, the time interval T is set to 15 seconds so that they can carefully move in a dark place.

In a dark place with no outside light, on the other hand, an object does not cause a residual image and object blurring if the object makes a motion in the long-time exposure. Hence, a synthesized image with no blurring can be obtained if shootings are successively performed with the time interval T of 0 second, in other word, with no movement of an object between shootings. Synthesizing captured images can realize simplified shooting of a starry sky snap. The flows of the simplified shooting are the same as those in steps S520 to S529.

In the meanwhile, the initial value of the time interval T is set to 10 seconds for the reason that setting a self-timer to 10 seconds is necessary for a photographer to be shot as an object using the self-timer. Setting both the self-timer and the time interval T to 10 seconds when shooting a starry sky snap with a self-timer makes it easier for a user to get a timing of shooting initiation.

By preparing settings for both a case where an object moves after being shot and a case where an object does not move, it becomes possible for a user to select an appropriate setting according to environments for shooting, such as whether shooting is performed in a suburban or urban area and whether with or without moonlight.

Processes in steps S1015 to S1027 are the same as those in steps S513 to S525 in FIG. 5. The background shooting in step S1026 needs to be performed immediately after the shooting using electronic flash in step S1023 since the background shooting is for extracting a region of a person (a brighter region than an image obtained by the shooting in step S1026) from an image obtained by the shooting using electronic flash in step S1023. This mean that the interval between the shootings in steps S1023 and S1026 is shorter than the interval between the shootings in steps S1026 and S1033 described in detail later when the time interval T is not 0 second.

In step S1028, the system control unit 201 acquires from the system memory 212 the time interval T for the starry sky snap set in step S1014 and determines whether or not the time interval T is 0 second.

If the time interval T is set to 0 second, the process advances to step S1032; otherwise (if the time interval T is set to any of 5 seconds, 10 seconds, and 15 seconds), counting of the time interval T is started in step S1028 and the process advances to step S1029.

In step S1029, the light emitting unit 112 is caused to emit light during a time between shooting of an object and shooting of a starry sky in order to indicate that the time is for the object to move. Further, a sound is pronounced to an object through the pronunciation unit 217.

Further, changing a method for issuing the notification while shooting according to the length of time to the start of starry sky shooting allows a person as an object to recognize that starry sky shooting is about to start. When starry sky shooting is starting in two seconds, for example, a notification pattern (notification manner) may be varied. Examples of the variation that may be made in a notification pattern include making the intervals shorter of turning on the light emitting unit 112 and of causing the pronunciation unit 217 to pronounce a sound, and increasing the level of pitch of a sound.

Further, the display unit 101 issues a notification that prompts a person as an object to move out of a shooting range.

Figure 11C:
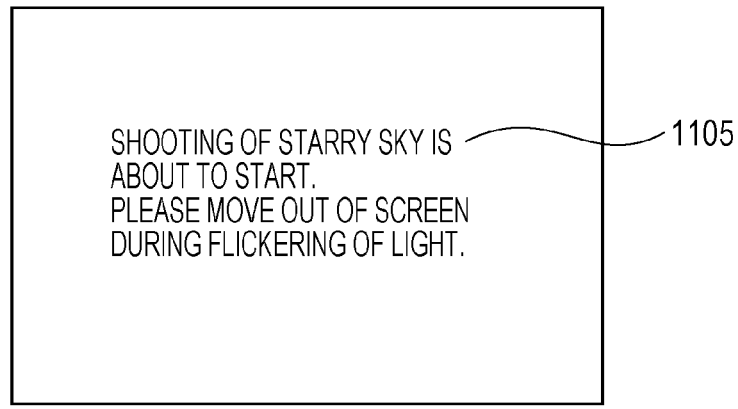

FIG. 11C illustrates a display example on the display unit 101 during shooting. In parallel to the notifications by the light emitting unit 112 and the pronunciation unit 217, a photographer sees, on the display unit 101, a guidance display 1105 prompting a person as an object to move out of a shooting range. When the photographer is not an object, the photographer can prompt an object to move, upon seeing the display on the display unit 101.

In step S1030, the system control unit 201 determines whether the time interval T has elapsed by the counting in step S1028. If the time interval T has elapsed, the process advances to step S1031; otherwise, the process returns to step S1029 to continue the notification.

In step S1031, the system control unit 201 stops the notifications by the light emitting unit 112, the pronunciation unit 217, and the display unit 101. By stopping the notifications prior to start of exposure for starry sky shooting, light emission by means of a notification from the light emitting unit 112 is prevented from affecting the exposure for starry sky shooting.

Processes in steps S1032 to S1034 are the same as those in step S526 to S528 in FIG. 5.

In step S1035, the system control unit 201 acquires from the system memory 212 the time interval T of the starry sky snap set in step S1014, and determines whether or not the time interval T is 0 second. If the time interval T has been set to 0 second, the process advances to step S1036; otherwise, the process advances to step S1037.

A processes in step S1036 is the same as that in step S529 in FIG. 5.

Processes in steps S1037 to S1048 are the same as those in steps S530 to S541 in FIG. 5.

Through the processes described above, a user can be known when an object may make a motion or move out of a shooting range in a case where shootings of a starry sky and the object are performed in a row.

Note that whether or not the time interval T is to be set to 0 second may be determined according to the judgment made based on the brightness of a person as an object about whether or not the object will cause a residual image if the object makes a motion at the time of long exposure without moving. In that case, a photographer selects a photometry setting mode, not the time interval T, in the starry sky snap mode setting menu 1102 in FIG. 11B. A method for shooting when the photometry setting mode has been selected will be hereinafter described.

If the photometry setting mode is selected in step S1014, a photographer selects a time interval for moving from 5 seconds, 10 seconds, and 15 seconds.

Based on the result of photometry performed in response to turning-on of a first shutter switch signal SW1 in step S1015, it is determined that the time interval T will be set to 0 second or a time interval set by the photographer.

Based on the photometry result, it is determined whether the brightness at the time of long-exposure shooting is darker than the predetermined brightness at which no residual image will appear if an object moves. If the brightness of the object is determined to be not greater than the predetermined brightness, the time interval T is set to 0 seconds. On the other hand, if the brightness of the object is determined to be greater than the predetermined brightness, the time interval is set to the time interval that the photographer has selected. When a notification is issued that prompts an object having been shot to move, the object can know that it is better for her/him to move in order to obtain an image with no residual image The processes described above allow a photographer to perform shooting at an appropriate time interval T set based on the brightness of a person as an object, in a case where shootings of a starry sky and the person are performed in a row.

Although FIGS. 10A to 10D illustrate a case where a time for a person to move is provided after the person is shot, and then a starry sky is shot, the sequence of shooting a person and shooting a starry sky may be switched. If a person is to be shot after shooting of a starry sky, processes in steps S1032 to S1034 are performed after "YES" is chosen in step S1021 described with reference to FIGS. 10A to 10D, and then, processes in steps S1028 to S1031 are performed, followed by processes in steps S1022 to S1027. In that case, the notification issued by the display unit 101 between shooting of a starry sky and shooting of a person in step S1029 is different from that described with reference to FIG. 11C, and the display unit 101 displays a guidance that prompts a person to move into a shooting range (within the screen). Further, a message displayed in an initial display (S1000) immediately after switching to the starry sky snap mode is different from the message in FIG. 11A, and a guidance is displayed that prompts a person to move into a shooting range (within the screen) after shooting of the starry sky.

In step S1033, the system control unit 201 performs AF processing to cause the photographing lens 203 to focus on the object, and performs AE processing to decide the f-number and shutter seconds (exposure time) of the shutter 204. The upper limit of the exposure time is determined depending on the photometry result. Further, since the stars to be shot continuously move according to the diurnal motion, limiting the exposure time to 30 seconds reduces the frequency of the stars not looking like dots in taken images. Note that the upper limit is not particularly limited to 30 seconds and may be set to any other time as long as it is within a predetermined range of time.

Further, a notification prompting an object to move may be provided by means of at least one of light emission, sound pronunciation, and a display on the display unit 101, or a combination thereof.

For a notification that uses light emission, the light emitting unit 112 may be either turned on in an intermittent manner or be in the turning-on status constantly. A combination of intermittent and constant light emissions of the light emitting unit 112 is usable as well.

While the time interval T (predetermined interval) in a case where an object does not move after being shot is 0 second in the embodiment, the time interval T may be set to be longer than 0 second (for example, 1 second or 2 seconds, which is shorter than 5 seconds). If the time interval T is shorter than a predetermined time (is not longer than a predetermined interval), shooting is performed without moving of an object.

[Other Embodiments]

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the embodiment has been described with reference to a case where the present invention is applied to an image capturing apparatus such as a digital camera, the present invention is not limited to this and may be applied to any other apparatuses if the apparatuses are capable of performing shooting a plurality of times and acquiring images to be synthesized. For example, the present invention is applicable to a mobile phone terminal, a mobile image viewer, a printer with a display, a digital photo frame, a music player, a game machine, an electronic book reader, etc. The present invention is carried out as well in such a manner software (program) for executing the functions of the embodiment is supplied to a system or an apparatus via a network or a recording medium of any type, and a computer (or CPU or MPU, for example) of the system or the apparatus reads out the program code and executes the program. The program and the recording medium that stores the program compose the present invention. The present invention enables a person to move more appropriately between shootings when a plurality of times of shootings are performed in a row, the shootings including a shooting of a person and a long-exposure shooting.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-272045, filed Dec. 27, 2013, which is hereby incorporated by reference herein in its entirety.

What is claimed is:

1. An image capturing apparatus comprising:
   an image capturing unit;
   a counting unit;
   a control unit configured to control the image capturing unit to perform a first shooting operation in which lighting on an object is executed during shooting, and to control the image capturing unit to perform a second shooting operation in which lighting on an object is not executed during shooting according to the counting unit having started counting after the first shooting operation and determined that a predetermined time period has elapsed; and
   a notification unit configured to issue, during a period from when the counting unit starts the counting after the first shooting operation is completed until when elapse of the predetermined time period is determined by the counting unit, a notification for prompting an object to move out of a shooting range.

2. The image capturing apparatus according to claim 1, wherein the second shooting operation is a long-exposure shooting operation performed in a dark place.

3. The image capturing apparatus according to claim 1, wherein the notification unit performs intermittent notification within the predetermined time period.

4. The image capturing apparatus according to claim 1,
   wherein the control unit controls the image capturing unit to perform a third shooting operation in which lighting on an object is not executed when the first shooting operation is completed, and
   wherein the control unit controls the counting unit to start counting when the third shooting operation is completed and the image capturing unit to perform the second shooting operation according to the predetermined time period having elapsed after the third shooting operation.

5. The image capturing apparatus according to claim 4, wherein the third shooting operation is a shooting operation for extracting a bright region from an image obtained by the first shooting operation by comparing an image obtained by the third shooting operation with the image obtained by the first shooting.

6. The image capturing apparatus according to claim 4, wherein the control unit performs control so that a time interval between the first and third shooting operations is shorter than a time interval between the third and second shooting operations.

7. The image capturing apparatus according to claim 1, wherein the notification unit includes a light emitting unit located on a side of the image capturing apparatus configured to be closest to an object.

8. The image capturing apparatus according to claim 1, wherein the control unit controls the light emitting unit so that light emission is stopped prior to start of exposure for the second shooting operation.

9. The image capturing apparatus according to claim 1, wherein the notification unit includes a pronunciation unit.

10. The image capturing apparatus according to claim 1, further comprising a display unit configured to display an image,
    wherein the control unit controls the notification to be performed through a predetermined display by the display unit.

11. The image capturing apparatus according to claim 1, wherein the control unit controls the image capturing unit so that shooting is performed a plurality of times in response to one shooting instruction, wherein the plurality of times of shootings includes the first and second shooting operations.

12. The image capturing apparatus according to claim 1, wherein the control unit controls the notification unit so that the notification unit issues a notification when the predetermined time period is longer than a predetermined interval.

13. The image capturing apparatus according to claim 1, wherein the control unit controls the notification unit so that the notification unit does not issue the notification during a plurality of times of shootings including the first and second shooting operations and issues a notification indicating an end of a last shooting of the plurality of times of shootings after the last shooting ends.

14. The image capturing apparatus according to claim 1, further comprising a setting unit configured to be used by a user to set the predetermined time period.

15. The image capturing apparatus according to claim 1, further comprising a synthesizing unit configured to superimpose and synthesize images obtained by a plurality of times of shootings including the first and second shooting operations.

16. The image capturing apparatus according to claim 1, wherein the control unit controls the notification unit so that a notification manner for the notification is changed according to an elapsed time of the predetermined time period.

17. The image capturing apparatus according to claim 1, wherein the control unit controls the notification unit so that the notification unit issues the notification separately from a notification indicating a start or an end of exposure for a plurality of times of shootings including the first and second shooting operations.

18. The image capturing apparatus according to claim 1, wherein the control unit controls the image capturing unit so that the second shooting operation is performed according to a photometry result in an exposure time within a predetermined upper limit of time.

19. The image capturing apparatus according to claim 1, further comprising a photometric unit,
wherein the control unit sets the predetermined time period to be not larger than a predetermined interval when a brightness measured by the photometric unit is not larger than a predetermined brightness.

20. The image capturing apparatus according to claim 1, wherein the notification unit issues the notification for prompting the object to move out of the shooting range within a time period in which the notification is being presented, prior to start of the first shooting operation.

21. The image capturing apparatus according to claim 1, further comprising a synthesizing unit configured to synthesize the image obtained by the first shooting operation and the image obtained by the second shooting operation.

22. A method to control an image capturing apparatus having an image capturing unit and a counting unit, the method comprising:
controlling the image capturing unit to perform a first shooting operation in which lighting on an object is executed during shooting;
controlling the image capturing unit to perform a second shooting operation in which lighting on an object is not executed during shooting according to the counting unit having started counting after the first shooting operation and determined that a predetermined time period has elapsed; and
issuing, during a period from when the counting unit starts the counting after the first shooting operation is completed until when elapse of the predetermined time period is determined by the counting unit, a notification for prompting an object to move out of a shooting range.

23. A non-transitory computer-readable recording medium storing a program to cause an image capturing apparatus, having an image capturing unit and a counting unit, to perform a method, the method comprising:
controlling the image capturing unit to perform a first shooting operation in which lighting on an object is executed during shooting;
controlling the image capturing unit to perform a second shooting operation in which lighting on an object is not executed during shooting according to the counting unit having started counting after the first shooting operation and determined that a predetermined time period has elapsed; and
issuing, during a period from when the counting unit starts the counting after the first shooting operation is completed until when elapse of the predetermined time period is determined by the counting unit, a notification for prompting an object to move out of a shooting range.

24. The image capturing apparatus according to claim 14, wherein the setting unit is capable of setting the predetermined time period to be a time period which continues for five seconds or more and fifteen second or less.

* * * * *